(12) United States Patent
Fradella

(10) Patent No.: US 8,242,649 B2
(45) Date of Patent: Aug. 14, 2012

(54) LOW-COST MINIMAL-LOSS FLYWHEEL BATTERY

(76) Inventor: Richard B. Fradella, San Juan Capistrano, CA (US)

( * ) Notice: Subject to any disclaimer, the term of this patent is extended or adjusted under 35 U.S.C. 154(b) by 525 days.

(21) Appl. No.: 12/463,275

(22) Filed: May 8, 2009

(65) Prior Publication Data
US 2010/0283340 A1    Nov. 11, 2010

(51) Int. Cl.
*H02K 5/173* (2006.01)
(52) U.S. Cl. .................. 310/74; 310/90.5; 318/599
(58) Field of Classification Search .......... 310/74, 310/90.5; 318/599
See application file for complete search history.

(56) References Cited

U.S. PATENT DOCUMENTS

| | | | |
|---|---|---|---|
| 2,254,698 A | 9/1941 | Hansen, Jr. | |
| 2,305,416 A | 12/1942 | Hansen, Jr. | |
| 2,315,408 A | 3/1943 | Faus | |
| 2,340,781 A | 2/1944 | Wagner | |
| 2,651,550 A | 9/1953 | Sharp | |
| 2,869,934 A | 1/1959 | Milligan et al. | |
| 2,869,935 A | 1/1959 | Milligan et al. | |
| 3,107,310 A | 10/1963 | Carriere et al. | |
| 3,107,948 A | 10/1963 | Lovegrove | |
| 3,114,582 A | 12/1963 | Milligan | |
| 3,124,396 A | 3/1964 | Barager | |
| 3,143,704 A | 8/1964 | Wright | |
| 3,157,053 A | 11/1964 | Hall | |
| 3,221,389 A | 12/1965 | Cowell | |
| 3,233,950 A | 2/1966 | Baermann | |
| 3,326,610 A | 6/1967 | Baermann | |
| 3,584,276 A | 6/1971 | Ringland et al. | |
| 3,597,023 A | 8/1971 | Baermann | |
| 3,657,676 A | 4/1972 | Milligan | |
| 3,696,277 A | 10/1972 | Liska et al. | |
| 3,731,984 A | 5/1973 | Habermann | |
| 3,761,148 A | 9/1973 | Grosbard | |
| 3,791,704 A | 2/1974 | Perper | |
| 3,794,391 A | 2/1974 | Grosbard | |
| 3,807,813 A | 4/1974 | Milligan | |
| 3,810,683 A | 5/1974 | Keever et al. | |
| 3,811,740 A | 5/1974 | Sacerdoti et al. | |
| 3,856,200 A | 12/1974 | Lieb | |
| 3,860,300 A | 1/1975 | Lyman | |
| 3,899,223 A | 8/1975 | Baermann | |
| 4,080,012 A | 3/1978 | Boden et al. | |
| 4,085,355 A * | 4/1978 | Fradella | 318/703 |
| 4,127,799 A | 11/1978 | Nakamura et al. | |
| 4,295,083 A | 10/1981 | Leenhouts | |
| 4,358,723 A | 11/1982 | Scholl et al. | |
| 4,371,801 A | 2/1983 | Richter | |

(Continued)

*Primary Examiner* — Karl Tamai
(74) *Attorney, Agent, or Firm* — Albert W. Watkins

(57) ABSTRACT

A low-cost minimal-loss zero-maintenance flywheel battery, to store electric power from a DC power source by conversion to kinetic energy, and regenerate electric power as needed. Its vertical spin-axis rotor assembly is supported axially by repelling annular permanent magnets, and is centered by ceramic ball bearings which have axial preload that prevents vibration and augments axial rotor support. A regenerative multi-pole permanent-magnet motor, controlled by its 2-phase stator current, and connected by power and signal conductors to power interface electronics, is integrated within the flywheel assembly, in a vacuum enclosure supported by a self-leveling structure. Sinusoidal 2-phase stator currents are controlled by high-frequency pulse-width-modulated H-bridge power electronics that draw and regenerate controlled DC current with minimal ripple, responsive to respective 2-phase rotation angle sensors, the DC power voltage, and other settings. The electronics includes logic and overvoltage protection to prevent otherwise possible damaging current and voltage.

19 Claims, 13 Drawing Sheets

U.S. PATENT DOCUMENTS

| | | |
|---|---|---|
| 4,390,865 A | 6/1983 | Lauro |
| 4,417,167 A * | 11/1983 | Ishii et al. .................. 310/67 R |
| 4,444,444 A | 4/1984 | Benedetti et al. |
| 4,483,570 A | 11/1984 | Inoue |
| 4,511,190 A | 4/1985 | Caye et al. |
| 4,520,300 A * | 5/1985 | Fradella ........................ 318/603 |
| 4,563,046 A | 1/1986 | Shimamoto |
| 4,668,885 A | 5/1987 | Scheller |
| 4,700,094 A | 10/1987 | Downer et al. |
| 4,723,735 A | 2/1988 | Eisenhauere et al. |
| 4,732,353 A | 3/1988 | Studer |
| 4,785,212 A | 11/1988 | Downer et al. |
| 4,961,352 A | 10/1990 | Downer et al. |
| 5,126,317 A | 6/1992 | Agarwala |
| 5,159,219 A | 10/1992 | Chu et al. |
| 5,202,598 A | 4/1993 | Katsumata |
| 5,204,569 A | 4/1993 | Hino et al. |
| 5,214,981 A | 6/1993 | Weinberger et al. |
| 5,220,232 A | 6/1993 | Rigney et al. |
| 5,314,868 A | 5/1994 | Takahata et al. |
| 5,353,655 A * | 10/1994 | Mishler ........................ 74/5 R |
| 5,386,166 A | 1/1995 | Reimer et al. |
| 5,392,176 A | 2/1995 | Anderson |
| 5,398,571 A | 3/1995 | Lewis |
| 5,419,212 A | 5/1995 | Smith |
| 5,436,516 A | 7/1995 | Yamazaki et al. |
| 5,441,222 A | 8/1995 | Rosen |
| 5,495,221 A | 2/1996 | Post |
| 5,514,923 A | 5/1996 | Gossler et al. |
| 5,521,448 A | 5/1996 | Tecza et al. |
| 5,540,116 A | 7/1996 | Hull et al. |
| 5,559,381 A * | 9/1996 | Bosley et al. .................. 310/74 |
| 5,614,777 A | 3/1997 | Bitterly et al. |
| 5,675,201 A | 10/1997 | Komura et al. |
| 5,679,992 A | 10/1997 | Miyamoto et al. |
| 5,681,012 A | 10/1997 | Rosmann et al. |
| 5,703,423 A | 12/1997 | Fukao et al. |
| 5,708,312 A | 1/1998 | Rosen et al. |
| 5,722,303 A | 3/1998 | Hull et al. |
| 5,783,885 A | 7/1998 | Post |
| 5,831,362 A | 11/1998 | Chu et al. |
| 5,847,480 A | 12/1998 | Post |
| 5,861,690 A | 1/1999 | Post |
| 5,880,544 A | 3/1999 | Ikeda et al. |
| 5,883,499 A | 3/1999 | Post |
| 5,969,446 A | 10/1999 | Eisenhauere et al. |
| 5,977,677 A | 11/1999 | Henry et al. |
| 6,019,319 A | 2/2000 | Falbel |
| 6,069,428 A * | 5/2000 | Nelson ........................... 310/90 |
| 6,111,332 A | 8/2000 | Post |
| 6,121,704 A | 9/2000 | Fukuyama et al. |
| 6,130,831 A | 10/2000 | Matsunaga |
| 6,166,472 A | 12/2000 | Pinkerton et al. |
| 6,182,531 B1 | 2/2001 | Gallagher et al. |
| 6,231,011 B1 | 5/2001 | Chu et al. |
| 6,236,127 B1 | 5/2001 | Bornemann |
| 6,262,505 B1 | 7/2001 | Hockney et al. |
| 6,288,670 B1 | 9/2001 | Villani et al. |
| 6,388,347 B1 | 5/2002 | Blake et al. |
| 6,420,810 B1 | 7/2002 | Jeong |
| 6,486,627 B1 | 11/2002 | Gabrys |
| 6,566,775 B1 * | 5/2003 | Fradella ........................ 310/90.5 |
| 6,570,286 B1 | 5/2003 | Gabrys |
| 6,577,090 B2 * | 6/2003 | Brown ........................... 318/434 |
| 6,603,230 B1 | 8/2003 | Abel |
| 6,630,761 B1 | 10/2003 | Gabrys |
| 6,664,880 B2 | 12/2003 | Post |
| 6,700,259 B1 | 3/2004 | Lin et al. |
| 6,703,735 B1 | 3/2004 | Gabrys et al. |
| 6,710,489 B1 * | 3/2004 | Gabrys ........................ 310/90.5 |
| 6,727,616 B1 | 4/2004 | Gabrys et al. |
| 6,727,617 B2 | 4/2004 | McMullen et al. |
| 6,750,588 B1 | 6/2004 | Gabrys et al. |
| 6,770,995 B1 | 8/2004 | Foshage |
| 6,794,776 B1 | 9/2004 | Gabrys |
| 6,794,777 B1 * | 9/2004 | Fradella ........................ 310/74 |
| 6,798,092 B1 | 9/2004 | Gabrys |
| 6,806,605 B1 | 10/2004 | Gabrys |
| 6,825,588 B2 | 11/2004 | Gabrys et al. |
| 6,867,520 B2 | 3/2005 | Jennings |
| 6,897,587 B1 | 5/2005 | McMullen et al. |
| 7,034,420 B2 * | 4/2006 | Brackett et al. ................. 310/74 |
| 705,358 A1 | 5/2006 | Gabrys et al. |
| 7,119,520 B2 | 10/2006 | Wingett et al. |
| 7,263,912 B1 | 9/2007 | Gabrys et al. |
| 7,276,828 B2 | 10/2007 | Yeh et al. |
| 7,646,178 B1 * | 1/2010 | Fradella ........................ 322/46 |
| 2003/0052558 A1 | 3/2003 | Brackett et al. |
| 2010/0283340 A1 * | 11/2010 | Fradella ........................ 310/74 |

* cited by examiner

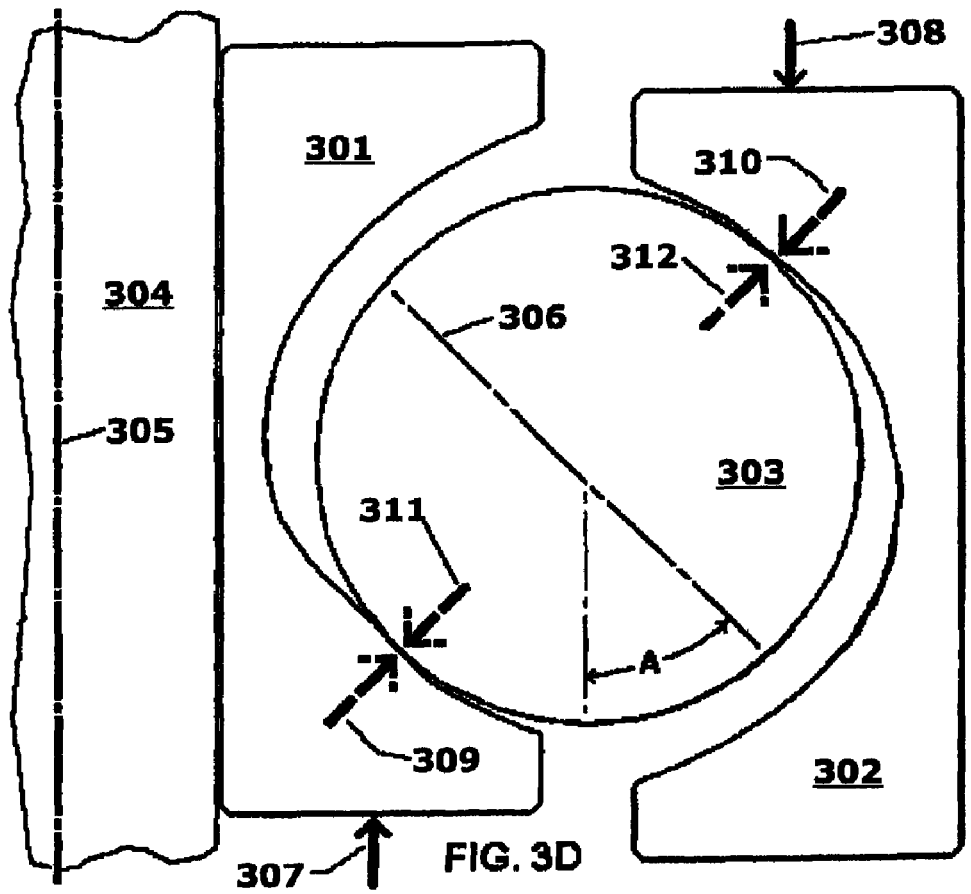
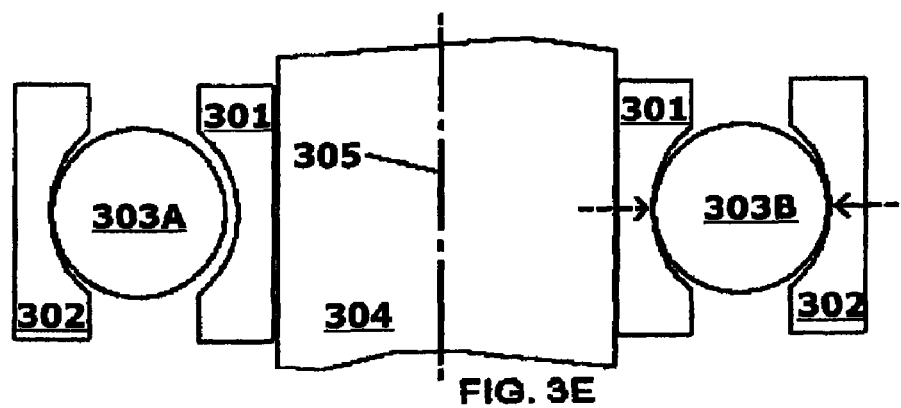

LOW-COST MINIMAL-LOSS FLYWHEEL BATTERY

CROSS REFERENCE TO RELATED APPLICATIONS

The contents of the co-pending application filed simultaneous herewith having Ser. No. 12/463,295 entitled "Broad-Speed-Range Generator" and invented by the present inventor is incorporated herein by reference in entirety.

BACKGROUND OF THE INVENTION

1. Field of the Invention

This invention pertains generally to rotary kinetic energy storage and retrieval mechanisms, and more particularly to flywheel batteries for converting electric power and storing it as kinetic energy, and regenerating electric power on demand.

Specifically it sets forth flywheel assemblies having a vertical spin axis supported axially by passive magnetic bearings, stabilized radially by ceramic ball bearings, cooperative with an integral regenerative motor controlled by power interface electronics, to provide practical long-duration electrical energy storage and regeneration, with minimal energy losses.

2. Description of the Related Art

Over the past 40 years, flywheel batteries have been set forth in the prior art, having various forms and combinations, intended to convert electric power to kinetic energy stored in a spinning flywheel, and generate electric power from its rotary inertia. Most of these flywheel storage devices provide only short duration power due to their high continuous losses. They require periodic maintenance, so they are usually housed in accessible locations. These locations are generally not consistent with flywheel safety. A flywheel that does not require maintenance can be housed in a relatively inaccessible location that can safely absorb the stored flywheel energy if it should ever explosively disintegrate.

A safe, cost-competitive, minimal-loss, zero-maintenance flywheel battery for providing long duration power and having a long service life, would provide significant benefits over high-power-loss flywheel storage that provides only short duration power, chemical battery storage, and fuel-burning generators, or combinations of chemical battery and flywheel storage to start fuel-burning generators used in stationary sites.

The present invention is intended to provide lower-cost reliable long-term safe zero-maintenance minimal-loss power storage and regeneration. It also is intended to facilitate practical on-site distributed solar and wind power installations. Parallel connection with like flywheel batteries (facilitated by its current control) enables flexible power and energy scaling capacity, to meet needs of various power installations and power grid load leveling.

For over 160 years, inventors have been working on many passive magnetic levitation configurations, to circumvent instability considerations described by Earnshaw, Gauss, and Maxwell. Flywheel rotor bearings affect configurations and element combinations of the entire flywheel battery system. My present invention does not need servo sensors, electronics, nor electromagnets, for its rotor bearings. This affords synergistic opportunities to use less parts in its power interface electronics and regenerative motor as well. New configurations, combinations, and improvements enabled by magnets that support the flywheel rotor weight, and ceramic ball bearings that center the rotor but do not sustain radial loads, are explained and illustrated herein.

Magnetic bearings without electronic servo loops are described in U.S. Pat. Nos. 5,495,221 and 5,783,885 plus 5,847,480 and 5,861,690 plus 5,883,499 and 6,111,332 by Post. They teach stable axial lift-off and/or radial centering, from repulsion forces caused by relative motion, between superconductor magnets (high-current conductors that produce magnetic fields opposing changing magnetic fields and so cause forces that levitate and center a spinning juxtaposed Halbach magnet array). Said patents teach mechanical bearings for rotor support at speeds lower than needed to achieve requisite magnetic lift-off or centering forces; and means for superconductor magnets to achieve repelling forces at ambient temperatures, plus means to automatically disengage mechanical bearings when requisite rotor spin speed is reached.

Conversely, my distinctly different present invention describes a flywheel battery that includes new power electronics, different rotor bearings which incur minimal power losses, a regenerative motor magnet array whose spinning magnetic field is confined to motor stator windings which minimize eddy current losses therein, and mechanical backup bearings to enhance safety and minimize damage in the event that the normal operation rotor bearings were to fail.

High rotor speeds are needed, to achieve compact flywheels with high energy/weight ratios. This requires a vacuum enclosure, to avoid excessive power drain due to air drag. Vacuum loss in prior art flywheel enclosures, due to flywheel assembly parts outgassing, may necessitate an integral vacuum pump, or costly maintenance, to keep air drag loss at acceptably low levels. Prior art flywheel assemblies that need periodic maintenance (mostly to lubricate and sometimes to replace mechanical bearings) would also need to be located where they are accessible. That usually precludes their installation in a site that can safely absorb the energy released if the flywheel rotor disintegrates while spinning at high speed.

Viscous friction in mechanical bearings that need lubrication can cause considerable drag torque at high spin speeds, and vacuum loss due to lubricant evaporation. Mechanical bearings of some prior art would incur serious heating and wear, running in vacuum at sustained high speed. Also, very high operating temperatures of critical bearing parts have been caused by heat generated from bearing losses, compounded by low heat transfer, further compounded by bearing lubrication loss accelerated by lubricant boil-off in vacuum. Ball bearings and roller bearings subjected to radial loads cause vibration due to ball passing events (a problem explained herein, with unique and distinct means to mitigate it). Prior art ball bearing applications have resulted in early bearing wear, their subsequent deterioration, and high failure rates. Prior art flywheel teachings do not include design considerations to mitigate precession torque due to Earth rotation (which tends to tilt the rotor assembly and therefore adds to rotor bearing radial loads). The prior art includes many combinations of magnetic and mechanical bearings, with distinct differences from my present invention, and does not describe the design considerations and system integration presented herein, nor means to improve ball bearing service life described herein.

Conversely, the present invention sets forth new configurations of ceramic ball bearings with lubricant coating, and thus almost no viscous drag nor vacuum enclosure contamination due to oil or grease lubricant evaporation. Said ceramic ball bearings, and their combination as set forth herein with cooperative flywheel assembly parts, have angular contact resulting from precision axial preload, incur minimum steady-state radial bearing loads, and thus mitigate ball pass vibration. These improvements are mainly intended to increase ball bearing service life.

Rechargeable chemical batteries are commonly used for storing on-site electric power. All types require frequent maintenance, may fail without warning, and deteriorate over time. Their lifetimes are usually limited to less than ten years—far shorter if subjected to repeated frequent deep charge and discharge cycles or not promptly recharged after supplying power. Most have toxic waste disposal problems. These battery drawbacks have been a major obstacle to on-site solar and wind power installations, because power storage, especially for off-grid installations, is subjected to daily charge and discharge cycles. Wind power is sporadic, and imposes additional power storage charge and discharge demands. To provide power on demand, such installations require power storage that is subjected to daily and highly variable charge and discharge cycles.

Accordingly, the present invention is intended to provide a reliable, safe, zero-maintenance, minimal-loss, and cost-competitive power storage and regeneration option, providing far longer service life that is not shortened by a practically unlimited number of charge and discharge cycles.

U.S. Pat. No. 6,630,761 for "Combination Mechanical and Magnet Support for a Flywheel Power Supply" and U.S. Pat. No. 6,710,489 for "Axially Free Flywheel System" by Gabrys, teach combination magnetic and mechanical flywheel rotor bearings, that have distinct and substantial differences from the rotor bearings of my present invention. These prior patents describe ball bearings within a very different configuration compared to applicant's present invention, in that they teach a different configuration of axial support magnets, and teach radial support by ball bearings whose inner races spin with a rotor shaft (whereas the present invention sets forth two ball bearings whose outer races spin with the flywheel rotor). Said prior patents do not teach spring means to apply a consistent ball bearing inner race lift force, which provides both a stable rotor lift force plus a consistent axial preload for the two ball bearings spaced a maximum practical axial distance from each other. Said prior patents do not address means to mitigate radial loads to ball bearings caused by Earth rotation precession torque which acts on a spinning flywheel rotor assembly. Said prior patents also do not teach system configurations and integration details with a regenerative motor and power electronics, as set forth in applicant's present invention.

Configurations and details of applicant's present invention, and their differences from said patents, are described and illustrated herein.

U.S. Pat. No. 6,897,587 by McMullen and entitled "Energy Storage Flywheel With Minimum Power Magnetic Bearings And Motor/Generator", the contents which are incorporated herein by reference, teaches active axial and radial magnetic bearings to support the flywheel rotor, which include mechanical backup rotor bearings, and materials that minimize cost of parts, to achieve lower cost flywheel systems. Conversely, applicant's present invention sets forth repelling magnet axial support and ball bearing radial stabilization. This prior art patent describes flywheel system embodiments and component configurations with distinct and substantial differences from applicant's present invention, and does not teach combinations of electronics, magnetics and mechanical elements, integrated as set forth in applicant's present invention. Said patent also does not teach means to mitigate problems from level shifting and from precession torque due to Earth rotation. Whereas applicant sets forth herein a flywheel assembly in a vacuum enclosure supported by self-leveling means, a feature described herein to facilitate installation, minimize idling losses, and accommodate possible ground shift over the flywheel service life.

The list of prior flywheel and related element patents cited here represents a very small fraction of many patents, which describe many possible diverse flywheel configurations. Other exemplary patents for flywheels and for other apparatus which may or may not be related but which provide illustration from which the teachings are incorporated herein by reference, include: U.S. Pat. No. 2,340,781 by Wagner; U.S. Pat. No. 2,651,550 by Sharp; U.S. Pat. No. 2,869,934 and U.S. Pat. No. 2,869,935 by Milligan et al; U.S. Pat. No. 3,107,310 by Carriere et al; U.S. Pat. No. 3,107,948 by Joseph Lovegrove; U.S. Pat. No. 3,114,582 by Milligan; U.S. Pat. No. 3,124,396 by Barager; U.S. Pat. No. 3,143,704 by Wright; U.S. Pat. No. 3,157,053 by Hall; U.S. Pat. No. 3,221,389 by Cowell; U.S. Pat. No. 3,233,950 and U.S. Pat. No. 3,326,610 by Baermann; U.S. Pat. No. 3,584,276 by Ringland et al; U.S. Pat. No. 3,597,023 by Baermann; U.S. Pat. No. 3,657,676 by Milligan; U.S. Pat. No. 3,696,277 by Liska et al; U.S. Pat. No. 3,731,984 by Habermann; U.S. Pat. No. 3,761,148 by Grosbard; U.S. Pat. No. 3,791,704 by Perper; U.S. Pat. No. 3,794,391 by Grosbard; U.S. Pat. No. 3,807,813 by Milligan; U.S. Pat. No. 3,810,683 by Keever et al; U.S. Pat. No. 3,811,740 by Sacerdoti et al; U.S. Pat. No. 3,856,200 by Lieb; U.S. Pat. No. 3,860,300 by Lyman; U.S. Pat. No. 3,899,223 by Baermann; U.S. Pat. No. 4,080,012 by Boden et al; U.S. Pat. No. 4,127,799 by Nakamura et al; U.S. Pat. No. 4,295,083 by Leenhouts; U.S. Pat. No. 4,358,723 by Scholl et al; U.S. Pat. No. 4,371,801 by Richter; U.S. Pat. No. 4,390,865 by Lauro; U.S. Pat. No. 4,444,444 by Benedetti et al; U.S. Pat. No. 4,483,570 by Inoue; U.S. Pat. No. 4,511,190 by Caye et al; U.S. Pat. No. 4,563,046 by Shimamoto; U.S. Pat. No. 4,668,885 by Scheller; U.S. Pat. No. 4,700,094 by Downer et al; U.S. Pat. No. 4,723,735 by Eisenhaure et al; U.S. Pat. No. 4,732,353 by Studer; U.S. Pat. No. 4,785,212 and U.S. Pat. No. 4,961,352 by Downer et al; U.S. Pat. No. 5,126,317 by Agarwala; U.S. Pat. No. 5,159,219 by Chu et al; U.S. Pat. No. 5,202,598 by Katsumata; U.S. Pat. No. 5,204,569 by Hino et al; U.S. Pat. No. 5,214,981 by Weinberger et al; U.S. Pat. No. 5,220,232 by Rigney II et al; U.S. Pat. No. 5,314,868 by Takahata et al; U.S. Pat. No. 5,386,166 by Reimer et al; U.S. Pat. No. 5,392,176 by Anderson; U.S. Pat. No. 5,398,571 by Lewis; U.S. Pat. No. 5,419,212 by Smith; U.S. Pat. No. 5,436,516 by Yamazaki et al; U.S. Pat. No. 5,441,222 by Rosen; U.S. Pat. No. 5,514,923 by Gossler et al; U.S. Pat. No. 5,521,448 by Tecza et al; U.S. Pat. No. 5,540,116 by Hull et al; U.S. Pat. No. 5,614,777 by Bitterly et al; U.S. Pat. No. 5,675,201 by Komura et al; U.S. Pat. No. 5,679,992 by Miyamoto et al; U.S. Pat. No. 5,681,012 by Rosmann et al; U.S. Pat. No. 5,703,423 by Fukao et al; U.S. Pat. No. 5,708,312 by Rosen et al; U.S. Pat. No. 5,722,303 by Hull et al; U.S. Pat. No. 5,754,425 by Murakami; U.S. Pat. No. 5,831,362 by Chu et al; U.S. Pat. No. 5,880,544 by Ikeda et al; U.S. Pat. No. 5,969,446 by Eisenhaure et al; U.S. Pat. No. 5,977,677 by Henry et al; U.S. Pat. No. 6,019,319 by Falbel; U.S. Pat. No. 6,121,704 by Fukuyama et al; U.S. Pat. No. 6,130,831 by Matsunaga; U.S. Pat. No. 6,166,472 by Pinkerton et al; U.S. Pat. No. 6,182,531 by Gallagher et al; U.S. Pat. No. 6,231,011 by Chu et al; U.S. Pat. No. 6,236,127 by Bornemann; U.S. Pat. No. 6,262,505 by Hockney et al; U.S. Pat. No. 6,288,670 by Villani et al; U.S. Pat. No. 6,388,347 by Blake et al; U.S. Pat. No. 6,420,810 by Jeong; U.S. Pat. No. 6,486,627 and U.S. Pat. No. 6,570,286 by Gabrys; U.S. Pat. No. 6,603,230 by Abel; U.S. Pat. No. 6,664,880 by Post; U.S. Pat. No. 6,700,259 by Lin et al; U.S. Pat. No. 6,703,735 by Gabrys; U.S. Pat. No. 6,727,616 by Gabrys et al; U.S. Pat. No. 6,727,617 by McMullen et al; U.S. Pat. No. 6,750,588 by Gabrys; U.S. Pat. No. 6,770, 995 by Foshage; U.S. Pat. No. 6,794,776 and U.S. Pat. No. 6,798,092 and U.S. Pat. No. 6,806,605 by Gabrys; U.S. Pat. No. 6,825,588 by Gabrys et al; U.S. Pat. No. 6,867,520 by Jennings; U.S. Pat. No. 7,053,589 by Gabrys et al; U.S. Pat. No. 7,119,520 by Wingett et al; U.S. Pat. No. 7,263,912 by Gabrys et al; U.S. Pat. No. 7,276,828 by Yeh et al; and 2003/0052558 by Brackett et al.

None of these configurations, nor other prior art known to applicant, includes the minimal-loss features of the regenerative motor and power interface electronics combined with the flywheel rotor bearings described herein, and other features described in applicant's U.S. Pat. Nos. 6,566,775 and 6,794,777. Additional patents by the present inventor, the teachings which are also incorporated herein by reference, include U.S. Pat. Nos. 4,085,355 and 4,520,300.

The present invention is intended to provide a reliable, safe, zero-maintenance, minimal-loss, and cost-competitive power storage and regeneration option, providing far longer power delivery times enabled mainly by minimal idling losses, compared to other flywheel batteries, and far longer service life that is not shortened by a practically unlimited number of charge and discharge cycles, compared to chemical batteries. Some of the main principles described in my prior patents are included in my present invention, with distinct differences and combinations, facilitated mainly by the new flywheel rotor bearing configuration set forth herein, improved electronics, and less parts needed to provide a substantially lower cost flywheel battery having comparable performance.

Applicant's present invention sets forth new flywheel battery elements, configurations, and combinations, to reduce parts and labor cost of the flywheel systems described in applicant's U.S. Pat. No. 6,794,777 for a "Robust Minimal-Loss Flywheel System". Said patent teaches a flywheel having contactless servo-stabilized magnetic bearings. It also teaches means for achieving virtually zero "idling loss" (a flywheel battery property comparable to chemical battery "self discharge") while its magnetically levitated rotor spins at high speeds, with configurations that avoid magnetic cycling of magnetic materials, and that block and buck eddy currents in stator windings. Said patent also teaches motor/generator means for high electromechanical power conversion efficiencies and nearly zero power loss while coasting at all speeds, and systems that can have virtually unlimited service life without need for maintenance. It also teaches power interface electronics, which exchange current with its DC (direct current) power bus and its motor/generator. It teaches magnetic levitation means that require virtually zero steady-state power. Its many attributes are very useful, but achieving them is difficult and requires very exacting conditions.

Conversely, applicant's present invention sets forth a flywheel battery with less difficult requirements and fewer parts, compared to elements and combinations taught in my U.S. Pat. No. 6,794,777. The present invention will reduce much flywheel battery cost and weight. It has fail-safe passive magnetic and ball bearings, with sliding surface backup. Its rotor bearings do not require position and rate sensors, feedback control loops, electromagnets, and power for them. However, it needs critical rotor balance and vibration damping means, to prevent damage to its ceramic ball bearings by rotor vibration, major earthquakes, and extreme shaking. Flywheel assembly ball bearing position, to minimize ball bearing radial loads due to Earth rotation, is analyzed and described in detail herein. Electronics of my present invention, which serve as interface between the motor stator windings, rotor angle sensors, and a DC power bus, include distinct differences, compared to electronics described in U.S. Pat. No. 6,794,777. Moreover, electronics of my present invention do not need to implement startup and turn-off algorithms for active magnetic bearings. New features are explained by way of drawings, detailed element and system interaction explanations, functional circuit schematics, current and voltage waveforms, and manufacturing process descriptions herein.

The flywheel assembly described in applicant's U.S. Pat. No. 6,794,777 contains 10 Hall-effect position sensors and 10 rate sensor coils, to provide magnetic bearing servo feedback signals. They must accurately sense magnetic fields responsive to axial and radial rotor position, with tolerances under a few gauss. So they must be shielded from nearby magnetic fields in a 10-kilogauss range. Servo PCBs (Printed Circuit Boards) responsive to said sensors must each be located on corresponding top and bottom flywheel assembly decks, very close to their respective sensor. An axial servo PCB, mounted to the top deck of my prior flywheel assembly prototype, needs signals from sensors at the top and bottom; so signal conductors between sensors at the bottom of the assembly to said PCB must be shielded from electromagnetic interference.

Additionally, ground loops (signal interference caused by small fractions of high electromagnet actuator currents in signal grounds) are troublesome. Moreover, although only minimal power for the prototype flywheel rotor's magnetic bearing servos will be needed during steady-state operation, peak power demand for said servos at startup or while limit-cycling can exceed 1000 watts. Radial and axial control must be simultaneously activated, because axial control alone is susceptible to rotor tilt instability; as predicted by analysis and witnessed during tests. And axial force needed to pull the prototype's 60-pound rotor to its optimum operating height, from a top starting position, is a few hundred pounds; requiring a large bottom axial electromagnet and very sturdy frame to support such high forces. A large top axial electromagnet, having large gaps in its iron poles, is also needed. As was predicted by SPICE analyses of very accurate and detailed servo loops, and demonstrated by applicant's prototype, magnetic bearing servo limit-cycling will occur unless many exacting conditions are met. Also, flywheel assembly tasks are relatively complex for said prior flywheel battery, and unless crucial precautions are heeded, can be hazardous to assemblers, working with magnetic forces up to a few hundred pounds between parts, caused by permanent magnets in the assembly. Assembly procedures are very difficult, involving such high force requirements and high stray fields, combined with very small, sensitive and delicate sensors. Therefore, labor and tooling cost is also considerably higher, for flywheel batteries taught in applicant's prior patents.

My prior patents teach a flywheel rotor supported during steady-state operation by magnetic means affixed to a top deck, whereas the flywheel rotor of my present invention is supported entirely by a bottom deck. Moreover, the maximum normal support force on the bottom deck of the present invention is only a small amount more than the rotor weight. This permits a substantially lighter flywheel battery having a larger rotor assembly.

Accordingly, a primary objective of the present invention is to provide a minimal-loss rotor bearing, which does not require the magnetic bearing servos taught in U.S. Pat. No. 6,794,777. My present invention has 8 connections, in its flywheel assembly illustrated in FIG. 1, whereas axial and radial position and rate sensors, PCBs, power transistors, and electromagnet coils in the flywheel assembly of my prior art patent needs over 100 connections. The total number of parts needed by the new flywheel battery system is far less. The present invention also obviates assembly and setup difficulties; and thereby is intended to achieve comparable performance with considerably less than half the labor cost for the flywheel assembly, and about half the total labor and parts cost for each flywheel battery system. The magnetic levitation configuration of my present invention is intended to achieve virtually zero hysteresis and eddy current losses as well, because no iron, no high-permeability steel, and no magnets are subjected to magnetic flux cycling, nor to substantial magnetic flux variation, due to rotor spin. So performance should be comparable to the flywheel batteries described in my prior patents.

General objectives of this present invention are to provide lower cost flywheel batteries, for stationary installations, affording very long and reliable service life with zero maintenance, and additionally incurring far lower energy losses than other prior art flywheel power storage devices.

A specific objective of the present invention is to provide combination magnetic and ceramic ball bearings described herein, and improvements facilitated thereby, to reduce flywheel battery cost and weight, without sacrificing high electromechanical power conversion efficiency, safety, durability, reliability, and minimal idling losses, as design trade-offs.

Axial preload means, for extending ball bearing service life, by preventing ball skips, skids, bounces, jumps, and ball pass vibration, which also augment rotor lift force, are a key part of this objective. The axial preload is also intended to precisely center the rotor with sufficient radial compliance to prevent rotor unbalance pounding the ball bearings at high spin speeds.

Flywheel assembly relative height and diameter considerations, which mitigate radial loads on ball bearings caused by Earth rotation precession torque, is an important related objective.

Another specific objective of the present invention is to provide self-leveling means for the flywheel assembly in its vacuum enclosure, to reduce installation labor cost and to prevent early ball bearing failure from radial loads caused by land shifting after flywheel battery installation.

Broad objectives of the present invention include a flywheel electric power storage system, and the elements to implement it, to provide practical cost-effective minimal-loss long-life DC (direct current) power. The flywheel has a vertical spin axis. It includes a flywheel assembly having new rotor bearings to provide axial rotor support by magnetic repulsion, with rotor centering stabilized by ceramic ball bearings having axial preload springs that prevent vibration and augment rotor support. Moreover, it has a regenerative permanent-magnet motor controlled by cooperative electronics, the motor integrated within its flywheel assembly, inside a vacuum enclosure having self-leveling means, connected by power and signal conductors to improved power interface electronics. The electronics includes new circuit elements, to produce high-frequency pulse-width-modulation on/off power switching control from analog signals, with over-voltage protection and turn-on delays to prevent unintended current and voltage that could otherwise damage power semiconductors.

In addition to the aforementioned patents and published applications, Webster's New Universal Unabridged Dictionary, Second Edition copyright 1983, is incorporated herein by reference in entirety for the definitions of words and terms used herein.

BRIEF SUMMARY OF THE INVENTION

New flywheel battery subsystems and combinations of elements, including new and improved electronics and different component elements, are herein described, for achieving the objectives described above, plus other advantages and enhancements. Key assembly procedures and manufacturing processes, needed to achieve these objectives, are also described.

A flywheel assembly having magnetically levitated vertical-spin-axis rotor support, including axially magnetized ring magnets juxtaposed to repel each other, which provide stable upward axial force, to support the rotor weight without need for electric power, and can accommodate moderate earthquakes; plus ceramic ball bearings near the top and bottom of the rotor, to maintain rotor centering, including consistent axial preload that augments rotor lift forces, is described herein and shown in FIG. 1, for a low-cost minimal-loss flywheel battery system. The present invention sets forth new configurations of ceramic ball bearings with lubricant coating, and thus almost no viscous drag nor vacuum enclosure contamination due to oil or grease lubricant evaporation. It also sets forth design details to provide consistent axial preload, and minimize ball bearing radial thrust from slight but inevitable rotor unbalance and precession torque due to Earth rotation. Said design details are intended to maximize ball bearing service life and minimize bearing rolling friction power losses.

Applicant's present invention also includes minimal-loss attributes provided by flywheel assembly magnetic materials adjoining said ceramic ball bearings, because they are not magnetically cycled. It further includes new minimal-loss high-reliability electronics. The present invention also sets forth flywheel assembly self-leveling means, for electric power storage and regeneration with minimal losses, which can tolerate moderate earthquakes and ground level shifting without performance or reliability degradation over the long service lifetime intended.

OBJECTS OF THE INVENTION

A safe, cost-competitive, minimal-loss, zero-maintenance flywheel battery for providing long duration power and having a long service life would provide significant benefits over high-power-loss flywheel storage that provides only short duration power, chemical battery storage, and fuel-burning generators, or combinations of chemical battery and flywheel battery storage to start fuel-burning generators used in stationary sites.

Accordingly, the present invention seeks to provide lower-cost flywheel batteries, for stationary installations, affording very long and reliable service life with zero maintenance, and additionally incurring far lower energy losses than other prior art flywheel power storage devices. It also seeks to facilitate practical on-site distributed solar and wind power installations.

The present invention for a new flywheel battery, its various new subsystems, new element combinations, and new electronics, has the following primary objectives and intended features. This list is exemplary and illustrative, but not meant to be limiting to the present invention in any way.

(1) A flywheel assembly for a flywheel battery, having axial repulsion ring magnets to axially support its rotor, and rotor centering stabilized by ceramic ball bearings which, implemented in said assembly having accurate rotor balancing, are not subjected to substantial external radial or axial loads.

(2) Consistent light axial preload means for ceramic ball bearings, preferably implemented with ball bearings having rolling contact ball separator cages; said preload means to prevent ball skipping, sliding, and ball pass vibration, which may otherwise reduce bearing service lifetime. Said preload means also configured to augment rotor lift force.

(3) Floating 12 vdc supplies, to provide reliable power for on/off drivers of upper power switching semiconductors connected in two H-bridge configurations, which control 2-phase motor/generator stator winding current, to improve reliability and minimizes power loss, of the upper power switches.

(4) A minimal-loss voltage regulator, which provides precise +12 vdc, −12 vdc, and +5 vdc to signal processing electronics and motor/generator Hall-effect rotor angle sensors.

(5) Flywheel assembly enclosure self-leveling means, to maintain a level flywheel assembly that can accommodate long-term ground level shifting.

(6) Over-voltage protection, to clamp the voltage across the DC power bus and prevent regeneration if said voltage exceeds a prescribed level; redundant with negative voltage feedback.

(7) Under-voltage lockout, to prevent driving the power switching semiconductors if the +12 vdc, −12 vdc, and +5 vdc regulator outputs are below prescribed operating levels of signal processing electronics.

(8) Switch-mode power transistor signal processing logic, to maximize motor drive mode power conversion efficiency and reduce stress on power electronics.

(9) Shoot-through protection logic and turn-on delays, to prevent simultaneously driving an upper and lower power transistor, on the same side of an H-bridge.

(10) More reliable and more precise signal processing electronics, to control stator currents so they are better sinusoidal approximations.

(11) Optimum motor angle sensor placement, to obviate prior art sensor feedback signal disturbances from strong magnetic fields.

(12) Mechanical design optimization to minimize ball bearing radial loads caused by Earth rotation.

BRIEF DESCRIPTION OF THE DRAWINGS

The present invention encompasses several engineering disciplines, which are known to those versed in this art. They include electronics, magnetics, feedback control systems, magnetic and stress finite-element-analysis computer software, SPICE dynamic circuit and system simulation software, rotational dynamics, gas dynamics, gyro-dynamics, and materials science. Each said discipline has standard terminology and illustration methods, to convey its structures and system combinations in the most concise and understandable way to persons versed in those disciplines. The descriptions and illustrations herein are intended to convey the most essential features of this present invention accurately, clearly, and concisely. Features set forth in prior art, with new improvement facilitated by the present invention, are herein briefly described, to explain differences and to provide clear comparisons.

Improvements to the prior art will be apparent to those versed in the art and in the various engineering disciplines encompassed by it, from the following description of the invention when considered in conjunction with the accompanying drawings, in which:

FIG. 1 shows a preferred embodiment of the flywheel assembly for my present invention, including two annular axially compressed spring means, which each exerts light and consistent axial preload for the upper and lower ball bearing, and together augment rotor lift force equal to the preload force sum. The assembly shown in FIG. 1 connects to electronics, shown in FIG. 5A and FIG. 5B, by four power conductors to the 2-phase stator windings, and four conductors to the two motor angle sensors.

FIG. 3D illustrates ball bearing forces and angular contact details resulting from axial preload.

FIG. 3E illustrates very different ball bearing radial loads, on two balls, due to an external radial load force, for a ball bearing with no axial preload. Displacement caused by the radial load force is exaggerated, to better explain this detail and resulting ball pass vibration.

DETAILED DESCRIPTION OF THE INVENTION

Figure 1:
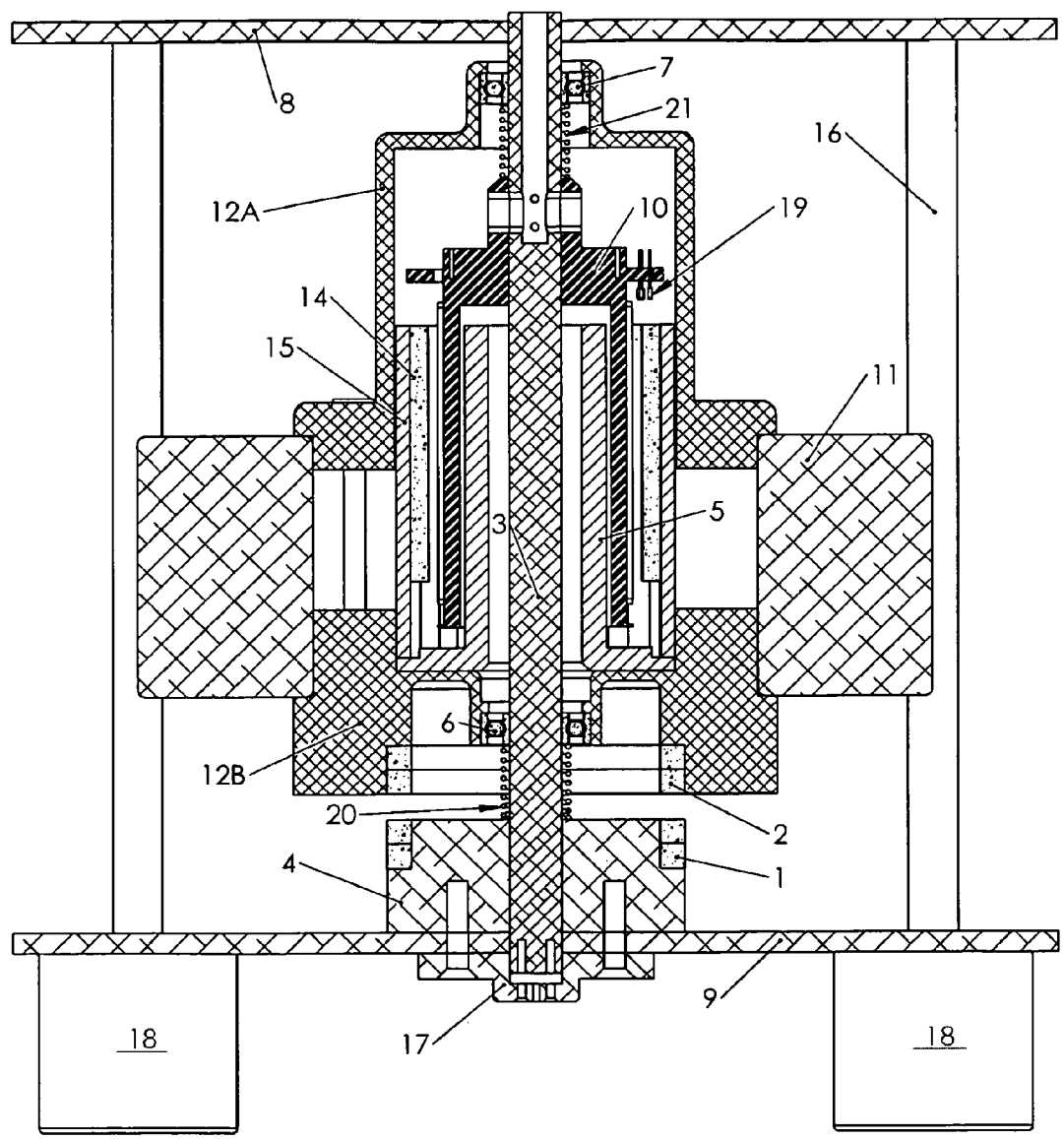
FIG. 1 illustrates cross-sectional views through the spin-axis, of the flywheel assembly, for my present invention. Said figure is in accordance with standard drafting practice, and conveys essential features of the flywheel assembly. For conciseness and clear understanding, the vacuum enclosure in which this assembly will be installed is not shown here. It is instead shown in FIG. 7 with the self-leveling apparatus and installation description.

A flywheel battery system is herein described, for storing and regenerating on-site electric power for a DC power bus in a stationary installation, by way of reference to FIG. 1, followed by detailed descriptions of its component elements and general variations. This system converts electric power to stored kinetic energy by the system's regenerative motor (sometimes referred to as a motor/generator because it alternately serves as a motor when accelerating the flywheel rotor and as a generator when decelerating the rotor).

FIG. 1 illustrates a cross-sectional view of a preferred embodiment of the flywheel assembly according to this invention; comprising axially magnetized ring magnet 1 affixed radially and axially relative to center shaft 3 by stator magnet holder 4; and like magnet 2, oriented to repel magnet 1. Magnet 1 and magnet 2 were each constituted by axial 2-magnet stacks, so that off-the-shelf magnets could be used for prototype quantity flywheel assemblies. FIG. 1 also shows ceramic ball bearing 6 near the flywheel assembly bottom; like bearing 7 near the top; top deck 8; bottom deck 9; a plurality of 3 or more holding posts 16; flywheel rotor inertia rim 11; top rim holder 12A; and bottom rim holder 12B. Also shown is stator winding assembly 10; motor magnets 14; a plurality of 3 or more flywheel assembly feet 18, of 2 motor angle sensors 19; outer motor rotor iron 15; inner motor rotor iron 5, and center shaft axial position lock 17.

The flywheel rotor is supported by permanent ring magnet 1, which axially repels the like permanent magnet 2 juxtaposed above it, to provide a stable axial lift force to levitate the rotor. Rotor centering is stabilized by ceramic ball bearings 6 and 7, supported by consistent axial preload forces applied to their inner races by respective axially compressed annular springs 20 and 21 which also provide additional stable axial lift forces through the bearing outer races to assist axial repulsion force from ring magnets 1 and 2 to levitate the rotor. Axial distance between ball bearings 6 and 7 should be large, compared to the rotor diameter, to minimize opposing radial loads on ball bearings 6 and 7, caused by precession torque on the rotor, due to Earth rotation.

Center shaft 3 precisely radially affixes stator magnet holder 4 and stator winding assembly 10, and serves as conduit for 4 stator winding conductors, plus 4 signal level conductors connected to the 2 rotor angle sensors, here depicted as element 19. Additional stationary elements include: top deck 8, which radially supports center shaft 3 at its top and limits upward axial movement of the rotor assembly; bottom deck 9, which axially and radially supports center shaft 3 and facilitates axial adjustment of center shaft 3 by a central set screw and preferably 4 holding screws through axial position lock 17. Top and bottom decks are additionally affixed by 3 or more posts depicted in FIG. 1 as part 16; and the entire structure is supported by 3 or more bottom support feet depicted here as part 18. Center shaft 3 constrains the inner races of ball bearings 6 and 7 radially. A slip fit therebetween allows axial movement, for axially compressed annular spring 20 to exert consistent axial lift force against the inner race of ball bearing 6 and like spring 21 to exert like consistent axial lift force against the inner race of ball bearing 7.

Said slip fit preferably requires center shaft 3 diameter and surrounding inner ball bearing 6 and 7 race diameter tolerances within 0.0005 inch. Additionally, lapped shaft 3 surface will preferably be provided a lubricant coating that does not evaporate in vacuum. This surface finish is also desirable to ensure a slip fit for the two surrounding axially compressed springs 20 and 21. These springs provide a consistent axial force against the inner ball bearing races, so their outer races push up against axial restraints of parts 12A and 12B. The outer races of the ball bearings preferably are also a slip fit with respective parts 12A and 12B that surround them. Close ball bearing outside diameter and parts 12A-B inside diameter tolerances are required, to avoid otherwise possible rotor unbalance due to concentricity errors. Center shaft 3 also has a temperature expansion coefficient that is almost equal to and preferably equal to the temperature coefficient of the ball bearing races, to maintain consistent axial slip drag friction, enabling operation in a wide range of ambient temperatures.

Parts 12A and 12B are preferably annealed magnesium alloy, selected for its low specific gravity and low modulus of elasticity, with thin cross-sections around both ball bearings 6 and 7, so they will absorb shock caused by unbalance forces at high rotor speeds. Polymers are another option, having elastic and shock absorbing properties. These options should help to prevent ball bearing pounding due to rotor unbalance.

Alternative preferred annular axially compressed spring embodiments include coil springs with flat ends and wave springs. An annular subassembly, including commonly available coil springs, is another option, which can help to ensure that the inner races of ball bearings 6 and 7 do not tilt relative to center shaft 3 (to help ensure no stiction due to binding and so help ensure bearing 6 and 7 preload is consistent). It includes a subassembly shown in FIG. 3C, to hold its plurality of commonly available coil springs, plus rods inside the coil springs, to maintain angular alignment with respect to the central axis, of its two spring holders (a top cylinder and a base). These springs are preferably coated with a lubricant that does not evaporate in vacuum.

Figure 4:
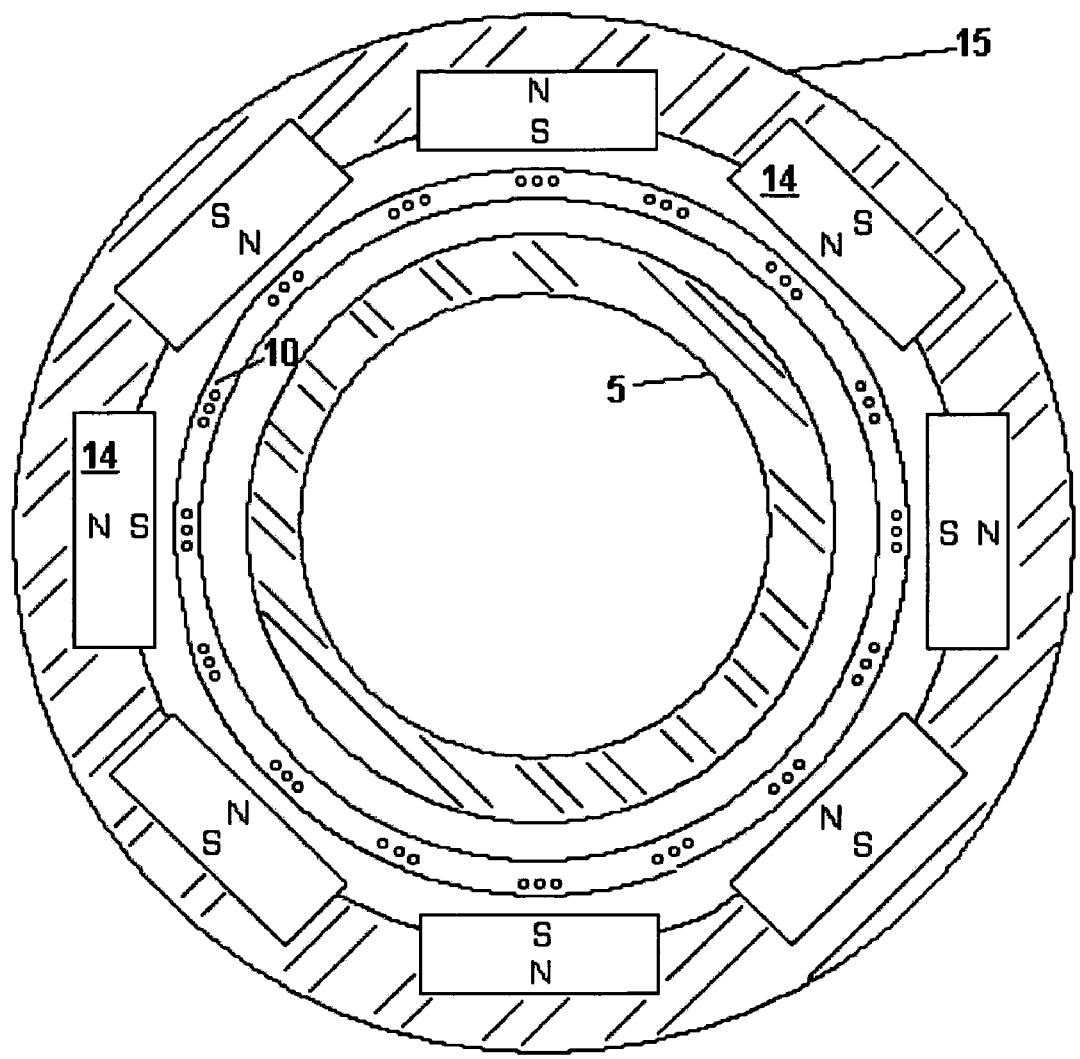
FIG. 4 is a cross-section view that shows motor/generator details of a 2-phase 8-pole embodiment of my present invention, including rectangular axial-field magnets seated within the outer rotor iron; which provides improved support for lower cost magnets, which provide a field pattern more nearly sinusoidal than standard arc shape motor magnets.

FIG. 1 and FIG. 4 show the motor/generator of my present invention, comprised of stator winding assembly 10 including 2-phase stator windings, cooperative with 8 rectangular magnets supported by outer rotor iron 15, which also provides outer magnetic paths for said magnets. Inner rotor iron 5 completes inner magnetic paths for said magnets. The 2 magnet sensors (depicted in FIG. 1 by element 19) each provide a feedback signal to DC power bus interface electronics (shown in FIG. 5A-5B) to synchronously control stator winding current. Each sensor is aligned with a corresponding stator winding phase. FIG. 4 also shows north (N) and south (S) polarities of the 8 magnets, and stator wire axial segments in stator winding assembly 10. The magnet sensors provide nearly sinusoidal and co-sinusoidal feedback signals for the power interface electronics.

A preferred embodiment of my present invention includes 8 or more motor poles, as shown in FIG. 4; implemented by rectangular magnets 14 preferably seated in flat slots machined in outer rotor iron 15; which facilitates alternate magnet polarities by placing the same type magnet with opposite polarity in alternate slots. Rectangular magnets provide an alternating field through the motor stator windings that is maximum near the magnet centers, thus better approximating a sinusoidal flux distribution vs. rotor angle, at the stator windings. They are standard available magnets, held in place and supported in the flat surfaces of outer rotor iron 15 by a thin layer of bonding material that fills voids and does not appreciably outgas in a vacuum environment.

In FIG. 1, Hall-effect sensor 19 detects returning field from motor magnets 14, to provide rotor angle feedback. Sensor 19 is preferably a ubiquitous linear 3-pin Hall sensor type incorporating an internal buffer amplifier, produced by Honeywell, Inc. Placed as shown, it is linearly sensitive only to radial magnetic fields. So it responds to the return fields above magnets 14. These fields vary approximately sinusoidally with rotor angle, and reach a few hundred gauss peak amplitude. Each nearest stator-winding conductor produces magnetic fields, which basically encircle the conductor, reaching less than 1 gauss per ampere-turn at the Hall sensors. With the Hall sensors placed at about the same axial position as the stator winding top circular segments, the relatively small magnetic fields due to stator current follow paths at the sensors which are axial, and hence orthogonal to the sensor sensitive axis, so signal interference from stator current is negligible.

High-permeability steels of outer rotor iron 15 and inner rotor iron 5 complete the magnetic paths for the regenerative motor's rotor magnets 14. Said parts are affixed to each other, so they rotate together, as taught in my U.S. Pat. Nos. 6,566,775 and 6,794,777. The field resulting from poly-phase sinusoidal stator current through motor stator windings, in the magnetic field between iron 5 and magnets 14, rotates always in synchronization with the rotor. Therefore, rotor steel and magnets do not incur magnetic cycling. Their hysteresis and eddy losses are thus virtually zero. Moreover, the magnetic field from magnets 14, which interacts with the field from the stator winding current, is substantially confined between iron 5 and 15.

New improvements are herein presented, over the motor/generator taught in my U.S. Pat. Nos. 6,566,775 and 6,794,777. In my present invention, high-permeability iron and magnets are also not subjected to magnetic flux cycling, nor to magnetic flux variation, due to rotor spin or to interaction with stator current. The new rotor bearings described herein facilitate a stator winding assembly 10 in FIG. 1, which includes a motor angle sensor 19 aligned with a respective winding phase. The rotor angle sensors 19 are preferably Hall-effect devices that include therein integrated amplifiers so their output signals are less susceptible to electromagnetic interference. Moreover, as positioned, sensors 19 are sensitive to only radial magnetic fields (thus able to sense returning field above the motor magnets 14, and reject stray fields from the stator currents). Also, sensors 19 are shielded by iron 5 and 15 from relatively distant ring magnets 1 and 2.

Means to minimize eddy losses in the stator windings are taught in my U.S. Pat. Nos. 6,566,775 and 6,794,777 by using what is called Spiral Litz wire by some wire manufacturers; implemented by many individually insulated strands that comprise the stator conductor. The strands are each part of a uniform spiral, which is covered by a mesh to protect the strands and hold them together. The active axial segments of stator windings 10, and their juxtaposition in the magnetic field from magnets 14, are shown in FIG. 4. My present invention rotor bearings facilitate improved means for supporting said stator conductors, in a location substantially free from stray magnetic fields.

Eddy current blocking and bucking methods taught in my U.S. Pat. Nos. 6,566,775 and 6,794,777 are retained in my present invention. These methods can significantly reduce idling losses, due to eddy currents in stator windings of this motor/generator. Those attributes are further facilitated in the present invention; wherein the stator windings, comprised of a numerous plurality of individually insulated strands, to block eddy paths that otherwise occur in large diameter single strand conductors, and wherein voltage across each axial segment (induced by magnetic field rate of change) accumulated across each strand, where the strands meet at the stator winding terminals, is equal, so that currents do not circulate from strand to strand, but are instead bucked by segment voltage averaging over the length of each strand. Stator windings have an improved form factor in my present invention, which was not as practical in my prior flywheel design. Motor stator assembly 10 and sensor 19 shown in FIG. 1 illustrate examples of the new geometry facilitated.

Figure 5A:
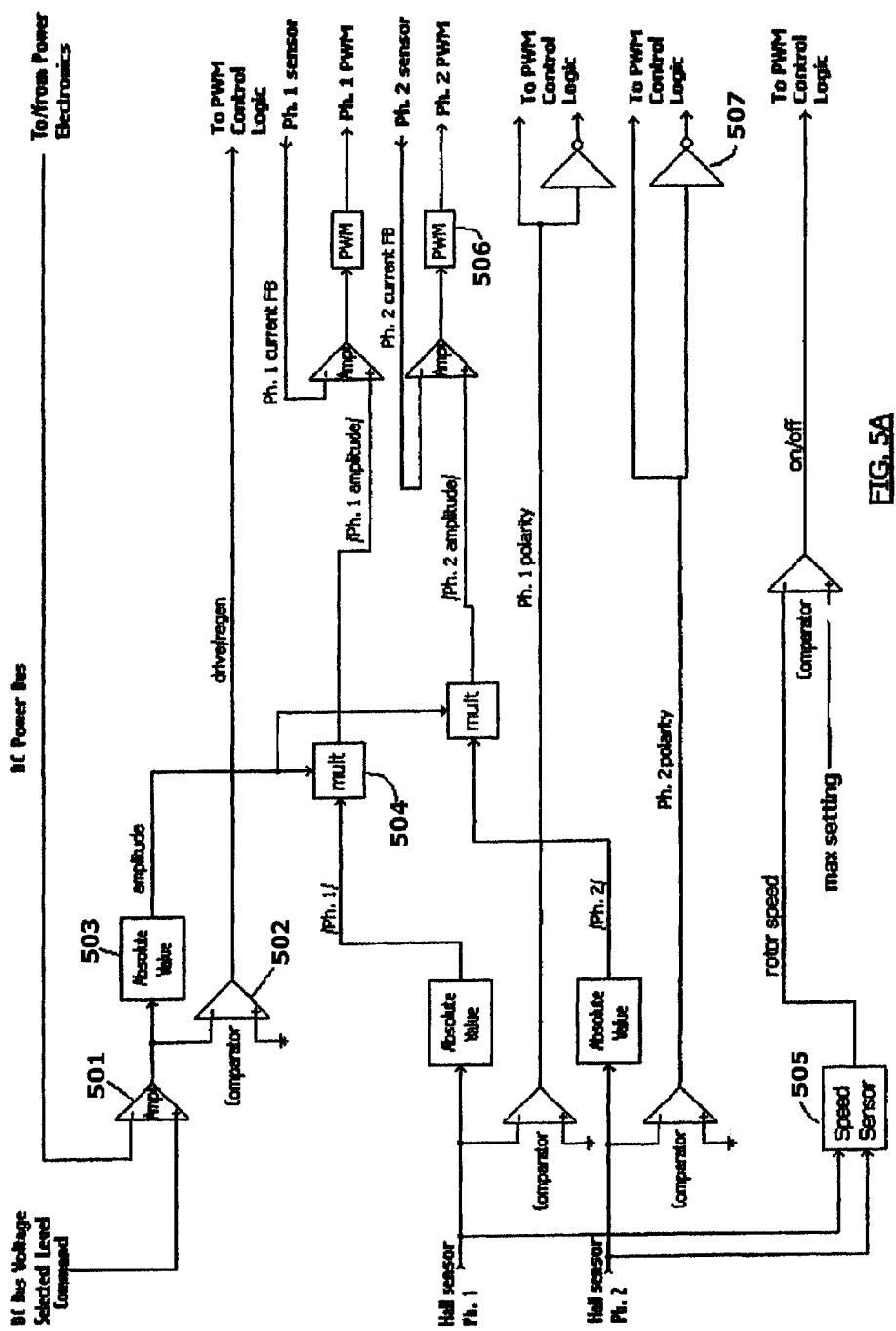
FIG. 5A illustrates a functional diagram of circuit elements comprising the signal processing section of the flywheel power interface PCB (printed circuit board), for a 2-phase motor/generator embodiment of the present invention. New circuit details and improvements of the present invention are illustrated and explained herein.
Figure 5B:
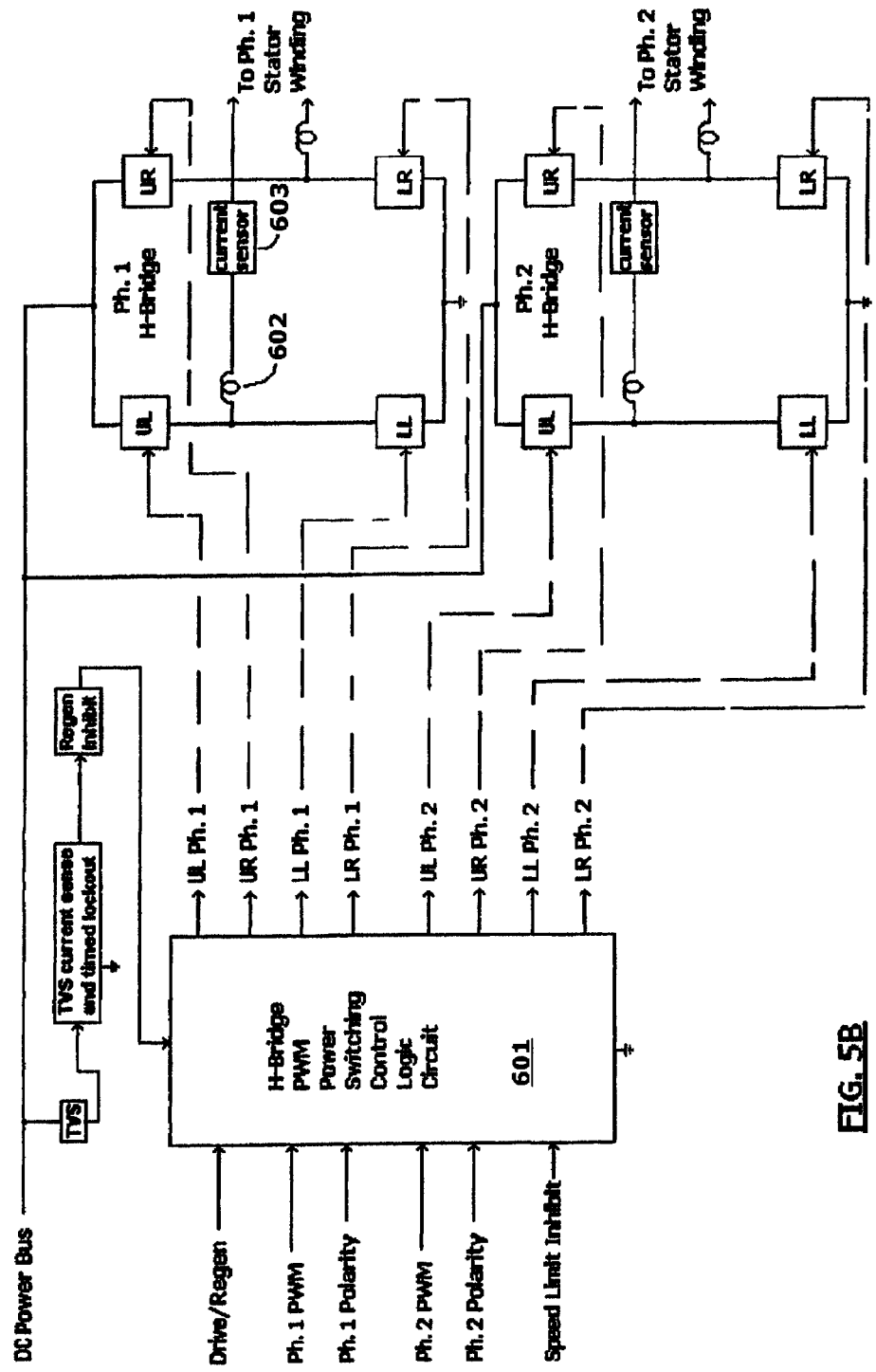
FIG. 5B illustrates a functional diagram of circuit elements comprising the power control section of the flywheel power interface electronics and power semiconductors connected as H-bridges that control current for a 2-phase motor/generator embodiment of the present invention.

FIG. 5A illustrates a functional circuit schematic of my present invention's signal processing section, which connects with and functions cooperatively with the power control section shown in FIG. 5B, to provide a power interface, between the flywheel motor/generator and an on-site DC power bus. Electronic engineers are very familiar with this succinct representation of over 1000 different components and interconnections; wherein the arrows indicate direction of signal flow. Amplifier function 501 is preferably implemented by a high-gain low-power operational amplifier, cooperative with feedback and bias components, which produces an output signal proportional to the difference of signals presented at its negative and positive (− and +) input terminals. Comparator 502 provides a bi-level output signal, responsive to the relative polarities of signals presented to its negative and positive input terminals.

Absolute value circuit 503 shown in FIG. 5A provides the absolute value of signals presented to its input, and can be implemented by various means known to those versed in the art. Multiplier 504 provides the product of the 2 signals presented to its 2 input terminals. Combining one of the two signals with a high-frequency pulse-width-modulated conversion of the other, in a CMOS integrated circuit bilateral analog switch such as the industry standard CD4066B, is an option. A preferred means to implement Multiplier 504 is each comprised of an 8-pin IC AD633 low cost analog multiplier produced by Analog Devices, Inc. Speed sensor 505 provides a signal proportional to speed, preferably by summing derivatives of sinusoidal and co-sinusoidal rotor angle signals, presented as signal currents I=C*dV/dt by capacitors C responsive to signal voltage V. PWM (pulse-width-modulation) circuit 506 converts analog signals presented to its input terminal to pulse-width-modulated signals which, cooperative with bi-level signals from comparators and logic inverters (for example 507), control H-bridge switch-mode duty-cycle. Note how this circuit is responsive to the on-site DC power bus voltage, the sinusoidal Phase 1 and Phase 2 rotor angle signals, and minor-loop feedback from Phase 1 and Phase 2 stator winding current sensors (which results in stator winding current-control for motor drive and regenerated power). Many circuit variations can be implemented, to perform the functions here described.

Figure 8A:
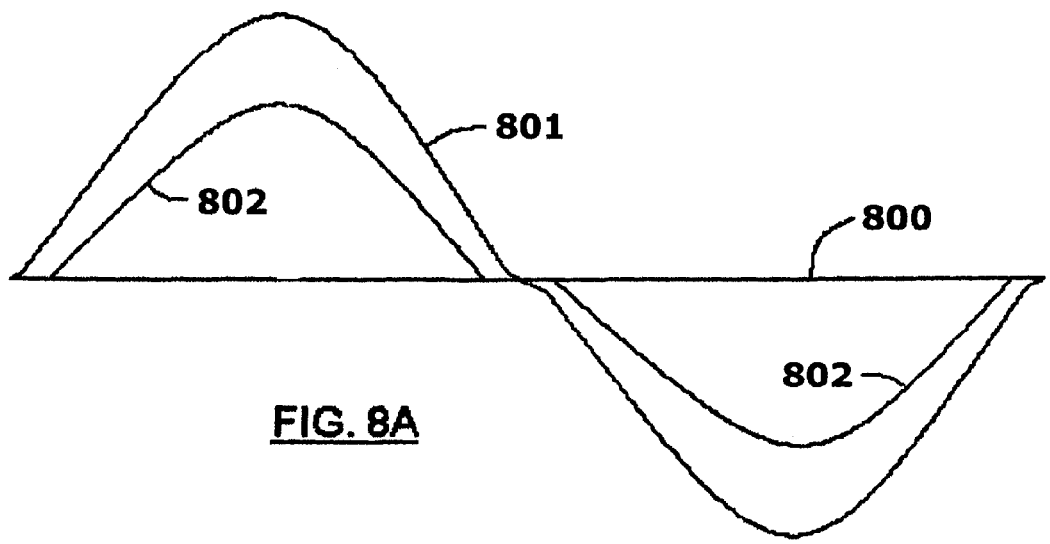
FIG. 8A illustrates nominal stator voltage and intended stator current waveforms, for both regenerative and driven motor functions, controlled by an H-bridge of my present invention.
Figure 8B:
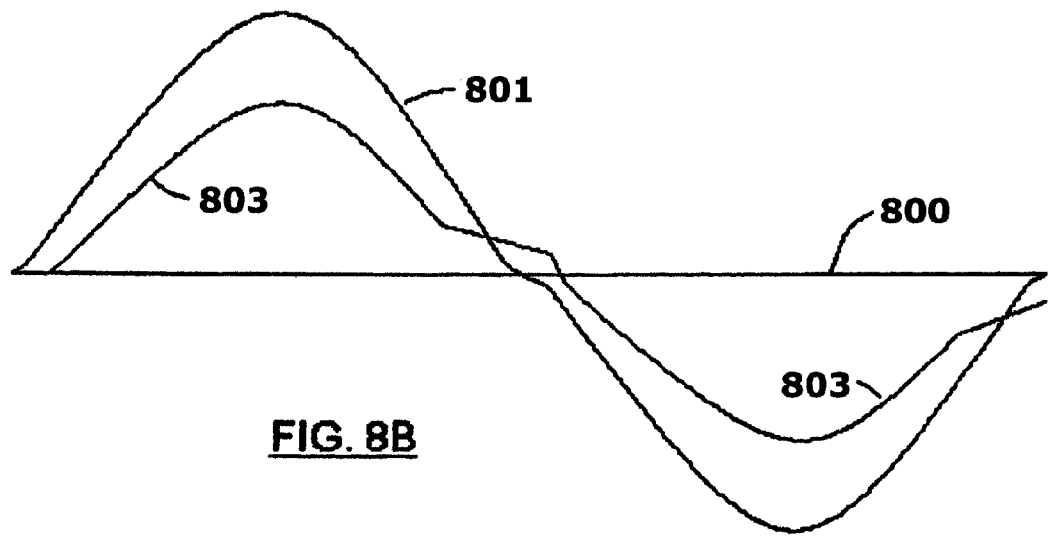
FIG. 8B illustrates nominal stator voltage and stator current waveforms, for a driven motor, controlled by a conventional prior art H-bridge.
Figure 8C:
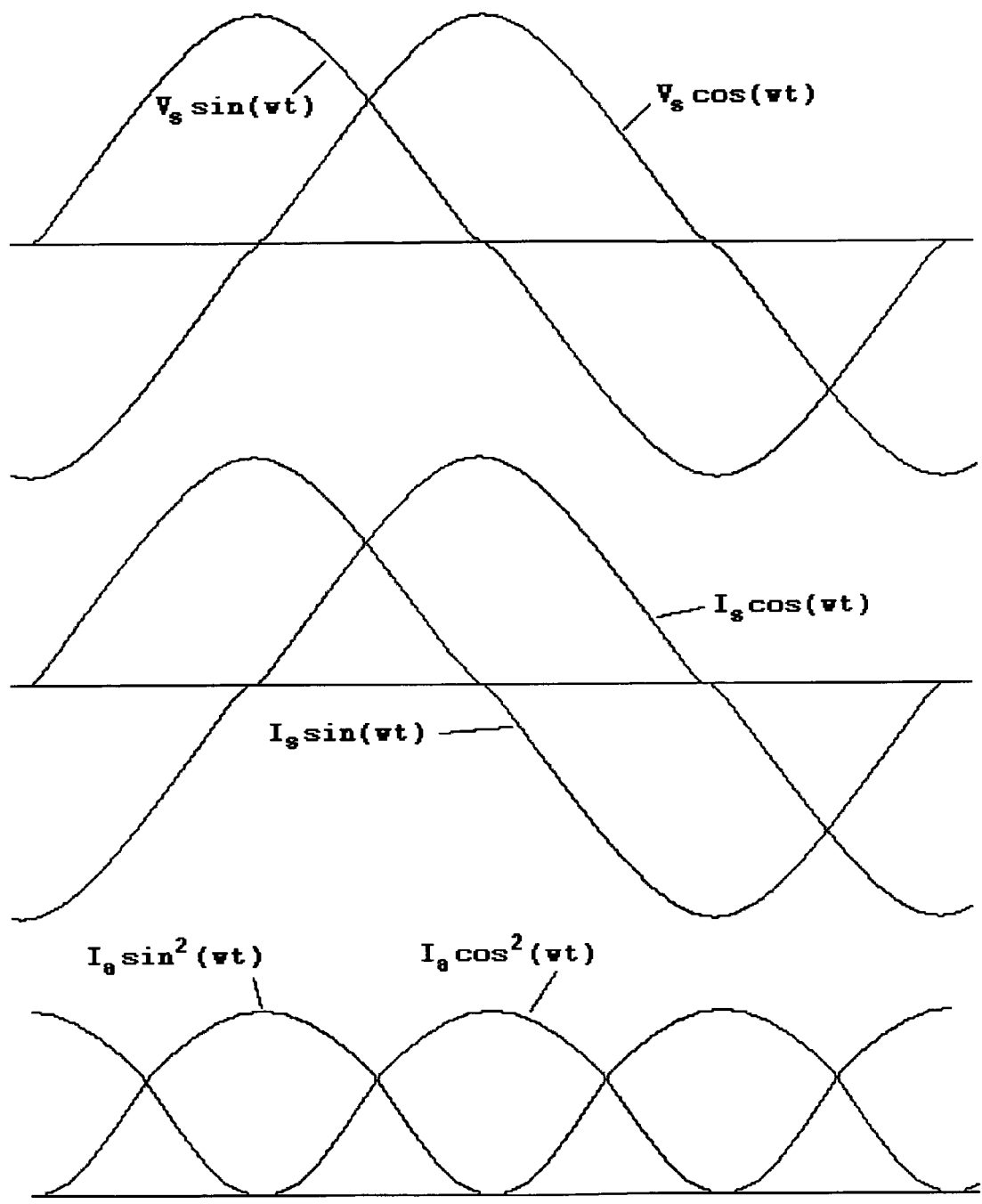
FIG. 8C shows nearly sinusoidal 2-phase stator voltages $V_s \sin(wt)$ and $V_s \cos(wt)$, with stator currents $I_s \sin(wt)$ and $I_s \cos(wt)$, all in time relation to $V_s \sin^2(wt)$ and $V_s \cos^2(wt)$.

Fundamental motor/generator operation will be understood by those versed in the art, by the description herebelow, and illustrated by the current and voltage waveforms in FIG. 8C. Respective 2-phase stator voltages $V_s$ sin(wt) and $V_s$ cos(wt) result from the substantially sinusoidal time variation of a rotor magnet field pattern across the axial stator winding segments. Its frequency (w) is equal to half the number of rotor magnet poles times the rotor rotational speed. The respective 2-phase stator currents $I_s$ sin(wt) and $I_s$ cos(wt) are each controlled by respective H-bridges, in both drive and regenerate modes. The 2 H-bridges, connected to a DC power bus, results in combined PWM pulse currents which, when PWM pulses are filtered, are equal to $I_a$ sin$^2$(wt) and $I_a$ cos$^2$(wt). Said filtered bus currents combine so drive and regenerated currents are $I_a = V_s I_s / V_{DC}$, with virtually zero ripple component. Electrical frequency (w) is proportional to rotor spin speed, which may vary over a normal 10-to-1 operating range. The low ripple current obviates need for costly ripple filters.

Peak $E_{smax}$ voltage of each axial winding segment, and torque, from the coreless motor/generator of the present invention, can be readily computed from equations known by all versed in the art, from elementary physics. For example:

At 6000 revolutions per minute rotor spin rate, $E_{smax}(\text{volt}) = B_{max}(\text{weber/m}^2) * L(\text{m}) * v(\text{m/sec})$ where, in our prototype flywheel battery:

$V_s = E_{smax} * (\text{number poles}) * (\text{number turns})$ $= E_{smax} * (8) * (3)$ $= 24 * E_{smax}$ $B_{max} = 6000 \text{ gauss} = 0.6 \text{ weber/m}^2$ $L = 4 \text{ inches} = (0.025 \text{ m/inch})(4 \text{ inch}) = 0.1 \text{ m}$ $v = [2 \text{ pi}] * (Radius_{stator})/rev * [6000 \text{ rev/min}] * (\text{min/60 sec})$ $= [6.28] * (2 \text{ inch})/rev * [6000 \text{ rev/min}] * (\text{min/60 sec})$ $= 1260 \text{ inch/sec}$ $= 32 \text{ meter/sec}$ So $V_s(\text{volt}) = 24 * 0.6 \text{ (weber/m}^2) * 0.1 \text{ (m)} * 32 \text{ (m/sec)}$ $= 46 \text{ volts peak.}$ At 10 amperes peak stator current, Torque (ntn meter) = $B_{max}(\text{weber/m}^2) * L(\text{m}) * I(\text{amp}) *$ $(Radius_{stator}) * 24$ $= 0.6 \text{ (weber/m}^2) * 0.1 \text{ (m)} * 10 \text{ (amp)} *$ $0.05 \text{ (m)} * 24$ $= 0.7 \text{ (ntn meter)}$ This is the maximum torque, distributed evenly over each axial stator winding segment of one stator phase, in the rotor magnet radial field. The torque produced by the second stator phase is zero, when maximum at the other phase, because flux density at the second stator phase is then zero, and current through the second phase is also then zero. As the rotor spins, the sum of torques from the 2 phases, is constant. So there is no torque ripple, and no cogging (mainly because the regenerative motor structure of the present invention has no iron core that would result in preferred rotor angles where magnetic reluctance is minimum).

Figure 9:
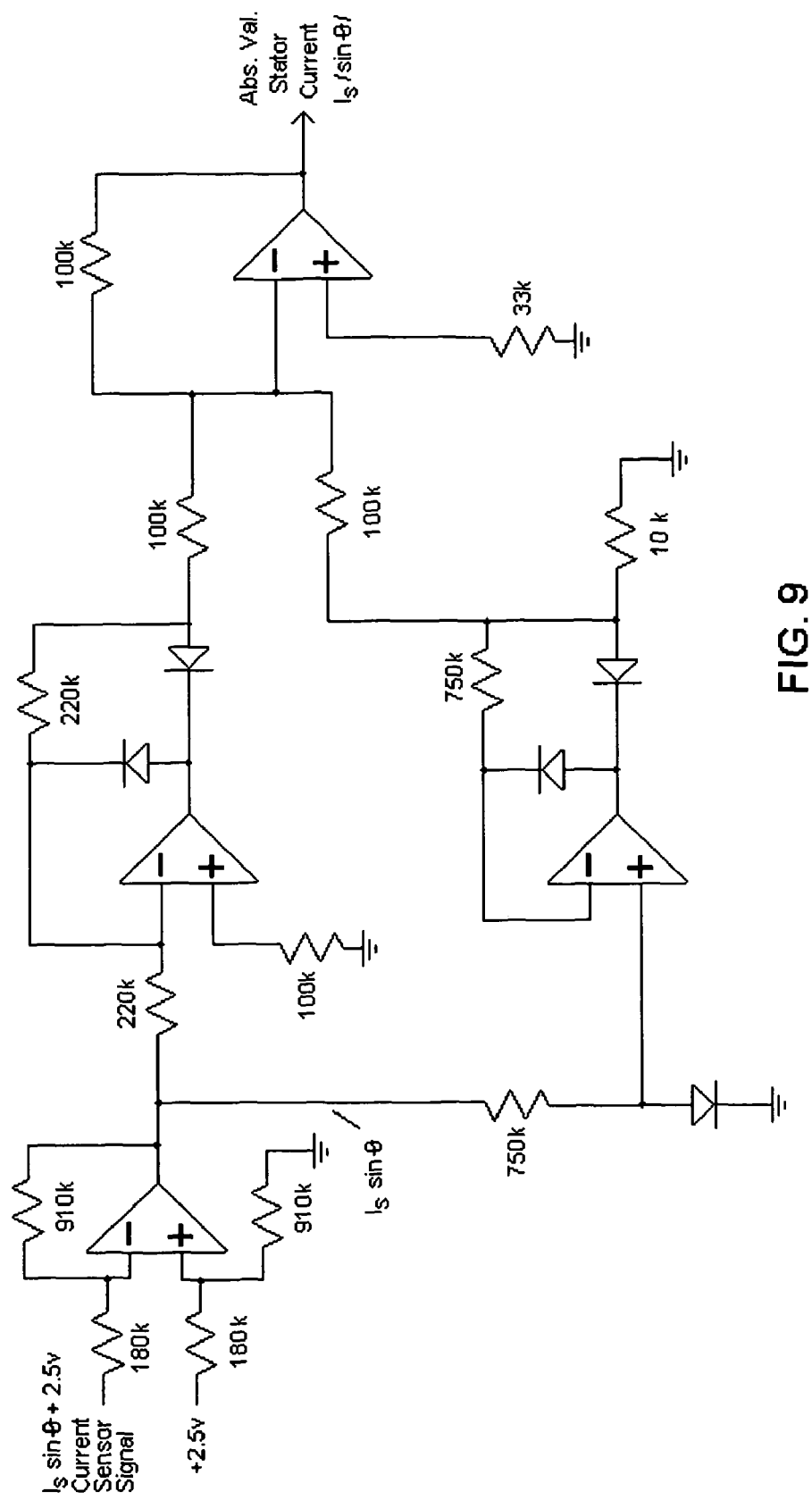
FIG. 9 shows a circuit that provides from a current sensor having a nominal 2.5 vdc offset at zero current and 1 v to 4 v output signal corresponding to respective peak current at plus and minus polarity, a precise output voltage signal proportional to the absolute value of said current.

A new circuit in the electronics of the present invention, to accommodate a current sensor output signal having a nominal +2.5 vdc at zero stator winding current, is illustrated in FIG. 9. The first opamp stage, familiar to all electronic engineers, converts the +2.5 vdc offset to zero, and produces an output voltage proportional to $I_s$ sin(wt) relative to signal ground within the opamp maximum linear output range, when supplied +12 vdc and −12 vdc. Then 3 successive opamp stages convert an essentially sinusoidal signal to its absolute value, with high precision over a very wide dynamic range, by the combination of a shunt to ground diode and four diodes inside opamp negative feedback loops as shown. This absolute value signal, proportional to stator current, is needed as negative current feedback for a respective stator winding phase minor feedback loop that provides a signal to a fast comparator, with a nominal 10 v peak-to-peak 50 kHz triangular wave input at its other input, which provides stator current control by H-bridge PWM, so current equals the commanded level. This PWM current control circuit is identical for each of the 2 phases. Each controls both drive and regeneration mode stator winding currents.

FIG. 5B illustrates signal flow from the signal processor shown in FIG. 5A, and PWM drive to cooperative H-bridge semiconductors; each phase current-controlled by ON/OFF switching of two upper and two lower power semiconductors. Elements denoted UL (for Upper Left), UR (for Upper Right), LL (for Lower Left), and LR (for Lower Right), are comprised of ultra-fast power switching semiconductors and diodes. Power MOSFET n-channel semiconductors are preferable due to lower conduction losses, for on-site DC power bus voltages up to about 200 vdc; IGBTs are preferable for higher voltages. Either is preferably controlled by H-bridge drivers having under-voltage lockout; with the drivers for UL and UR of each phase supplied floating 12 vdc having low capacitance to other circuit elements and to each other. Element 602 (one of preferably two ferrite core inductors, in series with stator windings, since two inductors provide short-circuit protection to the stator windings and to components in FIG. 5A and FIG. 5B) is a high-frequency inductor that responds to switched high-frequency voltage, with a triangular-wave current added to and controlling a low frequency sinusoidal current, in accordance with the relationship E=L dI/dt, where E is switched voltage across the inductance L, and dI/dt is the resulting rate of current change. The peak-to-peak triangular-wave component of said stator winding current is a small fraction of peak sinusoidal current resulting from modulated PWM voltage across said inductance L, in FIG. 5B denoted as element 602. Current sensor 603 is preferably implemented by a high-frequency Hall-effect device, which produces an output signal proportional to current through a conductor in series with a corresponding motor stator winding phase, to provide stator current feedback signals to minor feedback loops, which control relatively low frequency motor drive and regenerated current so that said current is in phase with voltage across the motor/generator stator winding terminals. Said current sensors are available for a wide range of currents, do not incur $I^2R$ losses, and are not susceptible to ground loop interference that may otherwise corrupt the signals.

Besides controlling current with only 4% power losses, the configuration shown in FIG. 5A and FIG. 5B can tolerate inadvertent short circuits between any combination of stator windings, with no damage or excessive current otherwise resulting, because its outputs each have series inductors that prevent high dI/dT so its current control loops limit output under any circumstance. Current control also facilitates parallel connection with like flywheel batteries. It will be noted that implementation for the power-up and power-down algorithms, needed for flywheels as described in U.S. Pat. No. 6,794,777 having active magnetic bearings, is not needed herewith, since the rotor bearings of my present invention function without need for electric power. Conversely, servo stabilized magnetic bearings cannot function without electric power.

The rotor angle sensors 19 in FIG. 1 each provide a feedback signal, which varies nearly sinusoidally with rotor angle, in synchronism with voltage across a stator winding having corresponding phase. Stator winding voltage amplitude is proportional to rotational speed. Feedback signals from the rotor angle sensors vary sinusoidally with rotor angle only (with peak amplitude independent of rotor spin speed). The configuration of parts, facilitated by my present invention, provides motor magnet fields for the 2 rotor angle sensors, which is available without additional parts and without interfering fields, at field strength compatible with standard linear Hall-effect sensors such as the Honeywell, Inc. ss49e.

In drive mode, the 2 H-bridges illustrated in FIG. 5B function as diagonal switch pair PWM (pulse width modulation) stator winding current regulators. The diagonal switch pairs (UL-LR is one pair, UR-LL is the other pair) are controlled by logic responsive to respective rotor angle sensors, whose outputs can be seen to coincide with respective stator winding voltage polarity. It will be understood by those versed in the art, that this current regulation requires stator voltage peak amplitude smaller than the DC power bus voltage. Since voltage amplitude is proportional to rotor speed in my present invention, this property provides redundant flywheel rotor speed limiting insofar as the DC power bus voltage remains constant. Three pulse-width-modulation switching methods for drive mode are described below, to explain new features of the present invention, to reduce losses and to prevent damage due to "shoot-through" currents:

FIG. 8A shows typical voltage waveform 801 across terminals of a stator winding, for a complete cycle, when two adjacent motor magnets having opposite polarities move past the stator winding. Ideally, current would have a matching sinusoidal waveform. But to insure that switches such as UL and LL are never conducting at the same time near the zero crossover line denoted 800, a small dead-band (with all power switches OFF) and nominal 40 microsecond turn-on delay at each crossover is implemented, to cause intended current waveform 802. Said dead-band and turn-on delay does not affect losses in the electronics or motor. However, if only for a microsecond or so, UL and LL, or UR and LR, are ON, the electronics can be destroyed by a very high current from the DC power bus through power switches on the same side of the H-bridge such as UL and LL, by what is called "shoot-through". H-bridge drivers, such as the Intersil HIP4081A, have internal logic and turn-on delay options, to prevent shoot-through. This integrated circuit is a preferred option. But such H-bridge driver voltage limits preclude their use for many applications, where DC bus voltage exceeds 80 vdc. For those applications, logic and turn-on delays ahead of the driver ICs are needed. The present invention includes logic to delay turn-off about 20 microseconds, for one switch of each diagonal pair driven at 50 kHz PWM, to minimize power losses when driving the flywheel. Said turn-off delay is inverse to PWM frequency. Its details are described herebelow. But without accompanying turn-on delays (whether inherent in the driver IC or included in logic controlling it), whenever a diagonal pair transitions to the alternate pair, shoot-through may otherwise be incurred. Said transitions occur whenever sinusoidal motor mode control changes polarity, and whenever transitioning between motor and regenerate modes.

As shown in FIG. 5B, switching logic drives upper switch UL concurrently with lower switch LR (herein called a diagonal pair) for one half-cycle, and UR concurrently with LL for the other half-cycle. Switching losses, including core losses in series inductors, would be substantial, without the turn-off delay described here: Current pulses at the PWM frequency, drawn from and fed back to the DC supply filter capacitor, would have peaks comparable to the stator current amplitude. Alternatively, if lower switch LR is driven ON for an entire half-cycle, while upper switch UL is pulse-width-modulated to control current, and for the next half-cycle LL is driven ON for an entire half-cycle while UR is pulse-width-modulated, stator current such as denoted by 803 in FIG. 8B would result. Note that, as voltage waveform 801 decreases and crosses the 800 axis, stator current 803 would persist, sustained by the series inductors; and that current 803 begins to substantially change only when inductor voltage is reversed. This switching method causes lower switching and core losses than the other method; and pulse current drawn from the DC supply at the PWM frequency has a peak value comparable to the stator current, but there would be no reverse current pulses, and PWM pulse current (which must be filtered by capacitors) is half that of the first method. However, motor losses are higher except at low spin speeds where the persisting current at the end of each half cycle has little consequence.

A good compromise over the above two switching methods results from switching UL at the pulse-width-modulation frequency, concurrently with LR; and after transition to the opposite polarity, switching UR and LL concurrently (as described above for the first switching method), except that a turn-off delay approximating the PWM period (20 microseconds for a 50 kHz PWM frequency), is included in switching logic driving LR and LL switches. This causes the switching to behave like the second method until the end of each PWM cycle, resulting in current waveform 802 in FIG. 8A, but without the losses here described. However, turn-off delay without turn-on delay, at each voltage polarity reversal and each drive/regenerate mode transition, could result in shoot-through, wherein UL and LL or UR and LR switches are ON simultaneously. High and damaging current levels would then be sustained by the power transistors. So an approximate nominal 40 microsecond turn-on delay means are included, when the alternate diagonal switch pair transitions to PWM control, to reverse sinusoidal stator current polarity. This turn-on delay is also imposed each time the H-bridge switching logic changes from drive to regenerate mode (to be sure that power MOS and especially IGBT upper power switches gated OFF are fully OFF before lower switches turn ON), and each time the logic changes from regenerate to drive mode.

When regenerating power, the H-bridge lower switches LL and LR alternately control boost (also known as fly-back) current regulation, to the DC power bus, of near-sinusoidal stator voltage, resulting in the waveforms seen in FIG. 8A. This boost regulation provides very efficient power control. Nearly DC regenerated current results, when regenerated current pulses from all phases of the poly-phase regenerative motor, are averaged by high-frequency capacitor filtering. It will be understood by those versed in the art, that the boost regulation here described also requires stator peak voltage less than the DC power bus voltage. If peak stator voltage exceeds the DC power bus voltage (which should not occur because rotor spin speed is detected and motor drive stopped when a prescribed speed limit is reached), each H-bridge would function as a full-wave rectifier, instead of its function according to my present invention (to control motor/generator power storage and regeneration). Normally, regenerated current is reduced by negative voltage feedback from the DC bus, when a selected DC bus voltage is exceeded, and increased when DC voltage is low. FIG. 8C shows, as a function of time, stator winding current and voltage, along with DC bus currents $I_s \sin^2(wt)$ of Phase 1 plus $I_s \cos^2(wt)$ of Phase 2 (which combine to equal controlled and relatively low ripple DC current $I_s$).

Kinetic energy is stored by the system through continuous motor control of its integral, high-speed spinning flywheel rotor assembly. Rotor parts are depicted in FIG. 1 by permanent ring magnet 2, rotor rim 11, top rim holder 12A, bottom rim holder 12B, motor magnets and outer rotor iron 14 and 15, inner rotor iron 5, which are all radially constrained by co-rotating outer races of ceramic ball bearing 6 near the rotor bottom and like bearing 7 near the rotor top. DC electric power is then available from the flywheel system, to supply DC power bus loads, by regeneration (i.e., conversion from mechanical to electrical power, by the same regenerative motor, driven by flywheel rotor inertia). The entire rotor assembly, although constrained radially by bearing 6 and 7 outer races, accommodates up to 0.050 inch axial movement from its nominal axial position by a slip fit between the co-rotatable bearing 6 and 7 inner races and center shaft 3. Sliding surface axial constraints, described herein, limit rotor axial movement.

Figure 2B:
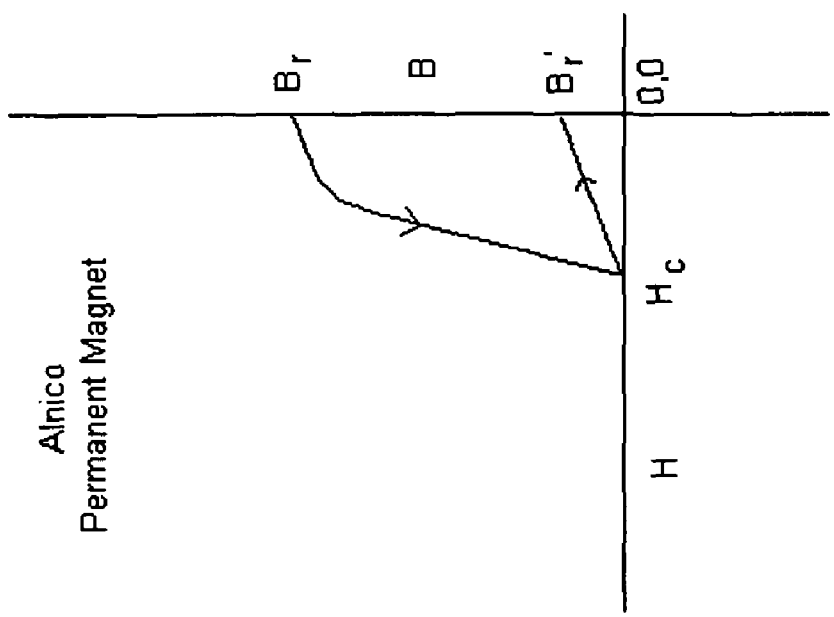
FIG. 2B illustrates flux density B vs. mmf H of a magnet having low coercivity $H_c$, wherein the B vs. H path followed, starting at $B=B_r$ and $H=0$ does not follow a straight line. Instead, with only moderate H, B starts to diminish with a slope considerably more than the starting point. Moreover, when H is reduced after reaching $H_c$ for this magnet, the B vs. H path does not retrace itself, so that $B=B_r'$ (smaller than $B_r$) after only one demagnetizing cycle. Subsequent magnetic cycling, similar to that shown, may even further demagnetize such magnets.
Figure 2A:
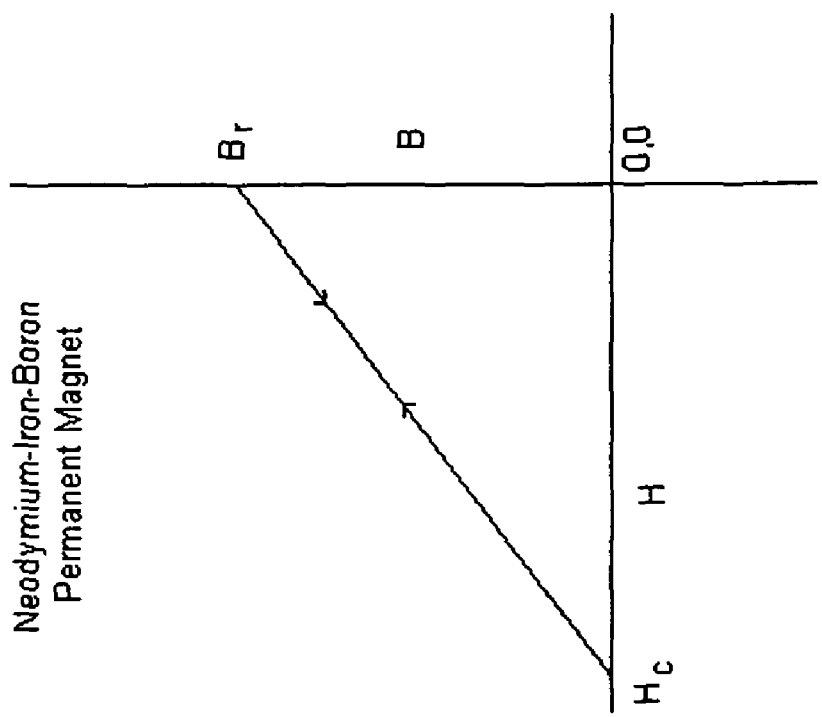
FIG. 2A illustrates magnetic flux density B vs. magnetomotive force (mmf) H of a permanent magnet having very high coercive force (also known as coercivity) $H_c$, wherein the B vs. H path followed, starting at $B=B_r$ (known as remanence and retentivity) and $H=0$ when the magnets are subjected to $mmf=H$ varying from zero to $H_c$ and back to zero. The path traversed, in both directions, is essentially a straight line whose locus returns to the same $B=B_r$ and $H=0$.

Permanent magnets 1 and 2 need to have very high coercive force $H_c$ (also known as coercivity) to perform as intended according to the present invention. They must also be large enough, so that their nearest co-axial proximity (about 0.25 inch), will develop sufficient lift to magnetically levitate the entire rotor weight plus additional force caused by axial shock during shipment, installation, or earthquakes; and their axial dimension must particularly be sufficiently large, so that demagnetizing mmf (magneto-motive-force) H is relatively small. Permanent magnets 1 and 2 are preferably Neodymium Iron Boron, and are identical to each other, so that each are subjected to the same mmf level. As can be seen by their demagnetizing cycle B vs. H characteristic in FIG. 2A, starting from retentivity $B_r$ and H=0, to B=0 and $H=H_c$, then essentially retracing its path back to $B=B_r$ and H=0, as shown in FIG. 2A, even demagnetizing mmf approaching $H_c$ will not significantly weaken these Neodymium Iron Boron magnets. Also, a sliding surface will contact the rotor assembly to limit magnet 1 and 2 proximity to over 0.20 inch.

Those versed in magnetics will understand that two identical repelling magnets, pushed together with enough force to make contact, will not cause demagnetizing mmf to each other exceeding $H_c$. Demagnetizing mmf incurred according to my present invention is substantially less than $H_c$. So axially magnetized permanent ring magnets, having magnetic properties as shown in FIG. 2A are preferred for my present invention. Conversely, magnets having low coercive force, such as Alnico, shown in FIG. 2B, would soon be demagnetized, if used for the function described herein, of the present invention. This can be seen by noting that B falls significantly from its original retentivity value $B_r$, for the Alnico magnet, under the influence of relatively small demagnetizing mmf; and then when subjected to demagnetizing mmf up to $H_c$, will return to a significantly smaller $B_r'$, when the mmf returns to zero. Also, each demagnetizing cycle, like that described hereabove, will further weaken such low coercivity magnets. Clearly, such magnets are not suitable in implementations that need to axially support the flywheel rotor assembly by repulsion force, as described herein for the present invention.

With reference to FIG. 1, those versed in magnetics will understand that the force which axially repels and therefore lifts magnet 2 results from a magnet pair that is unstable radially. And unless centered with each other so axial alignment is maintained, they would tend to flip so their fields will align. According to my present invention, centered alignment is maintained by ceramic ball bearings 6 and 7; said bearings each including an inner race having a slip fit around center shaft 3, so that maximum radial play of said inner races relative to shaft 3 is 0.0005 inch, so the inner races of bearings 6 and 7 will slide axially, if axial force on them approaches a pound or less.

Unstable (tilt) forces between magnets 1 and 2 are indeed negligible if magnets 1 and 2 are constrained so any radial misalignment therebetween never exceeds 0.010 inch and geometric axis tilt never exceeds 1 degree. High quality ball bearings and precision adjoining parts can constrain maximum radial misalignment, between magnet 2 affixed to the rotor and magnet 1 affixed to the stator, within 0.003 inch. Axis tilt of the rotor relative to the stator is held to within 1 degree by precision dimensional tolerances of cooperative adjoining parts.

Note that, as the rotor spins, permanent magnets 1 and 2 do not cause magnetic cycling to occur to each other, nor to stationary parts of the flywheel assembly, nor to the rotor assembly. But rolling elements such as balls or rollers in bearing 6 (which is nearest to magnets 1 and 2) will be subjected to magnetic cycling. So said rolling element balls would incur magnetic hysteresis and eddy losses if made of magnetic material, and would incur eddy current losses if made of conductive material.

Ceramic ball bearings (albeit without the rolling contact ball separator cages taught in U.S. Pat. Nos. 6,566,775 and 6,794,777) are now available from major bearing manufacturers. Ceramic balls would be ideal candidates for bearings 6 and 7, because they are non-magnetic and non-conductive. Steel balls would incur magnetic hysteresis and eddy losses, spinning in the strong magnetic field of ring magnets 1 and 2, seen in FIG. 1 near ball bearing 6. Moreover, ceramic materials which became available especially for ball bearings over the past several years, are harder than steel (the standard material theretofore used for ball bearings), and only about 40% the weight of steel; so centrifugal force on the balls and therefore transmitted to the bearing outer race, as the rotor spins, is only about 40% the force incurred by bearings with steel balls. Centrifugal force due to the mass of a spinning ceramic outer race would likewise be 40% as high compared to a steel outer race, but that is not an important criteria for this implementation. The inner race does not spin with the rotor, but it must slip axially with minimal force. Stainless steel races have higher thermal conductivity than ceramic. So contact between the inner races and center shaft 3 would help to stabilize and minimize bearing temperature. That consideration indicates the ball bearing races should preferably be stainless steel. Aluminum is a good option for the material of shaft 3. Thermal expansion coefficients for steel and aluminum are closer than ceramic and aluminum. That would permit slightly less clearance needed between shaft 3 and the ball bearing inner race, to accommodate a wider temperature range without compromising the needed slip fits and consistent axial drag forces of the ball bearings relative to shaft 3. In view of the foregoing design and material properties considerations, those reasonably skilled in the art could select from a variety of materials to implement shaft 3, including non-magnetic (low magnetic permeability) stainless steel.

Ceramic balls rolling between steel or ceramic races can operate without conventional grease or oil lubricants needed by steel ball bearings. This is a critical attribute, since the flywheel assembly will need to operate in a vacuum so that its spinning rotor does not incur air drag.

Figure 3A:
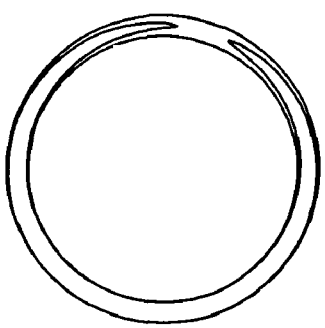
FIG. 3A illustrates a coil spring that may implement springs 20, 21 in FIG. 1. Note the smaller pitch near the coil spring ends, to facilitate a flat level end surface for evenly distributed axial force.
Figure 3A:
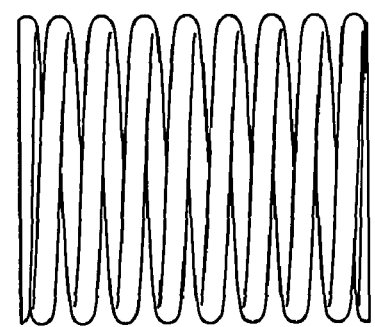
Figure 3B:
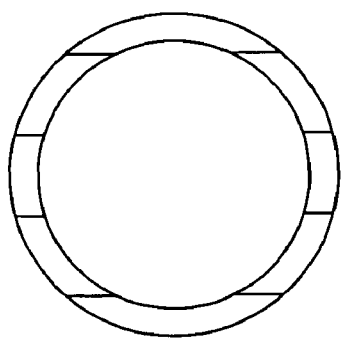
FIG. 3B illustrates a wave spring to provide an equivalent consistent axial preload and flexible rotor lift force.
Figure 3B:
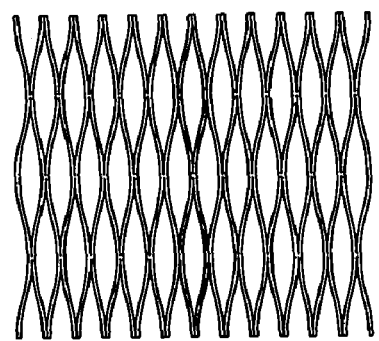
Figure 3C:
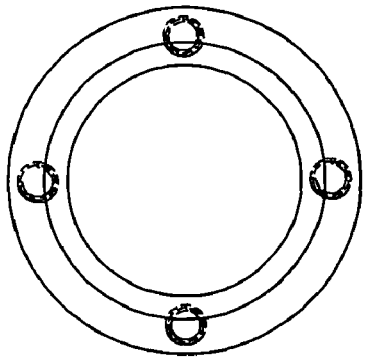
FIG. 3C illustrates a multiple coil spring subassembly, which can alternatively provide flexible rotor lift force and consistent axial preload for the two ball bearings in FIG. 1. It can be implemented with commonly available springs, held by a base having affixed rods, to flexibly support a top cylinder. The rods fit loosely within the springs, to align the cylinder and base.
Figure 3C:
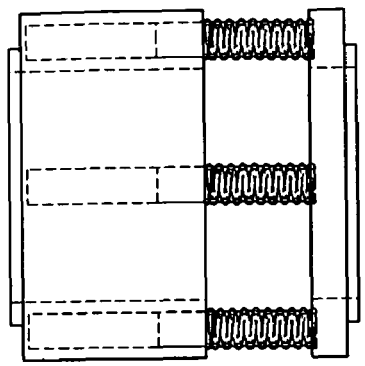

However, even in the most precise bearings, with no contaminants, without ample lubricant films to cushion the rolling balls, the balls may bounce, skip and slide, under varying rotor speed, varying temperature, and varying dynamic bearing loads. Accordingly, FIG. 3A-C illustrate means for applying a light and consistent axial preload, to prevent ball bearing skipping and sliding, which might otherwise cause pitting, scratching, and resultant early bearing failure.

All practical means must be a top priority, for balancing the rotor, and for absorbing by high loss elastic material around the ball bearings, an inevitable swirling motion due to rotor mass unbalance. Exemplary means contemplated herein, but by no means limiting to the present invention, include a thin flexible rim holder section around the ball bearings and elastomeric resin around the ball bearing outer races.

Insofar as perfect rotor dynamic balance may not be practically achieved, zero clearance ball bearings would be subjected to radial forces proportional to the distance between their geometric centers and a slightly off-center mass of a heavy rotor, times the square of rotor spin speed.

The slight radial compliance of normally centered outer races, resulting from axial preload, amounting to a compliance distance equal to radial clearance between the balls and the inner and outer races, should substantially help to prevent pounding the bearings due to rotor unbalance. Although the distance between the rotor center of mass and its geometric center (commonly called "unbalance" that causes swirling as the rotor spins) may be less than 0.001 inch, at high rotor spin speed, a practically unstoppable motion tending to cause rotation about the mass center, if transmitted to the outer races by a rigid surrounding part, would drastically shorten bearing life if the outer race is unable to move radially in compliance with said motion. Ball bearings having a large clearance between the balls and races can accommodate more radial unbalance than those having a small clearance. With no unbalance (coincident center of mass and geometric center), the ball bearing would spin as shown in FIG. 3D. With, for example, a rotor mass off-center by 0.001 inch, the ball bearing would spin with ball spin axis 306 angle A wobbling from its nominal angle, at a rate equal to the rotor spin speed. This motion is a complex but small departure from the ideal ball bearing spin mode shown in FIG. 3D, wherein each ball spins about an axis 306, which ideally remains constant for all rotor angles. Moreover, no ball is subjected to the state of ball 3B in FIG. 3E, where a 50-pound rotor with 0.001-inch off-center mass, spinning constantly at 10,000 rpm, would cause a persisting 140-pound swirling force, that might otherwise damage the ball and race surfaces. This swirling force F is computed from:

$$F = m * r * w^2$$

where for the prototype of this invention, rotor mass m=50 pounds, unbalance r=0.001 inch off geometric center, and w=radians/second spin speed. So:

$$F = (50\ lb_m)(0.001\ in)/(12\ in/ft)[(10000\ rev/min)(2\ pi/rev)(min/60\ sec)]^2(lb_f/lb_m 32\ ft/sec^2) = 140\ lb_f$$

At rotor spin speeds above resonance, the rotor essentially rotates about its center of mass. Thus, if the rotor center of mass is 0.001 inch from the geometric center, with (worst case) no compliant coupling to the ball bearing outer races, the rotor would impose a 0.002 inch end-to-end swirling motion on the two ball bearing outer races. This is a long-term operating mode.

Note that two 5-pound/inch axial preload springs result in an initial 10-pound/inch axial spring constant. At angle A=45 degrees, this results in a 10-pound/inch radial spring constant k that increases with radial deflection. In the absence of external and unbalance radial forces, it maintains the rotor at its geometric center. The fundamental frequency of resonance vibration=$w_n$=$(k_{eff}/m)^{1/2}$ For $k_{eff} = 20\ lb_f/in$, $$w_n = [(20\ lb_f/in)(12\ in/ft)/(50\ lb_m)(lb_f/lb_m\ 32\ ft/sec^2)]^{1/2}$$
$$(rev/2\ pi)$$
$$= 2\ rev/sec\ rotational\ speed\ resonance\ vibration$$

Damping slightly reduces resonant frequency.

Swirl force $F=m*r*w^2$ [and for m=50 $lb_m$, r=0.001 inch and $w_n$=2 rev/sec=120 rpm], is roughly 0.02 pound. That would cause the ball bearing outer races to swirl off center, while momentarily passing through resonance with sufficient damping, a distance relative to the inner races, of about (0.02 $lb_f$)/(20 $lb_f$/in)=0.001 inch.

Axial vibration resonant frequency is equal to $(k_{axial}/m)^{1/2}$. It includes the two axial preload springs plus force vs. axial travel from the equilibrium position determined by repulsion force from magnets 1 and 2 in FIG. 1. So $k_{axial}=k_{spring}+k_{magnet}$. Prototype tests and measurements of repulsion force vs. magnet gap indicate $k_{axial}$=20 $lb_f$/in. So the fundamental resonant frequency of axial vibration is roughly equal to 2 cycles/sec. Axial vibration amplitude dissipates in a few seconds. This damping appears to be mainly from sliding friction between the inner races of bearings 6 and 7 and center shaft 3.

A detail of the present invention, also intended to minimize ball bearing pounding, is the form and material of rim holders 12A and 12B shown in FIG. 1. These parts should preferably have a relatively low Young's modulus of elasticity (stress-to-strain ratio), relatively high mechanical hysteresis (energy loss due to stress cycling), and thin cross-section around bearings 6 and 7. This detail is intended to provide another (albeit perhaps less effective) shock absorber, between heavy rotor parts with slight unbalance, and the ball bearing outer races. It also is intended to help dampen vibration build-up at resonant frequencies.

By including only parts 12A and 12B between the ball bearings and heavy rotor parts, additive probable concentricity and radial dimension tolerance error build-up is minimized. Said dimension and concentricity errors can contribute to rotor radial mass unbalance. For parts 12A and 12B, concentricity of surfaces adjoining ball bearings 6 and 7 outer races, relative to surfaces adjoining rim 11 inside diameter and iron 15 outer diameter, is very critical. Other contributing factors to radial mass unbalance include slight density variations of large volumes such as the rotor rim, and slight deviations from roundness. So clearly, it is important to balance all rotor parts (such as the rim 11) and subassemblies (such as inner rotor iron 5 and outer rotor iron 15 with magnets 14 installed therein) held at the same surfaces by the balancing equipment, where they are to be joined when the rotor is assembled. Screws in the final rotor assembly should not be interchanged after the rotor parts and subassemblies are balanced.

Rolling contact ball separator cages are not available from ball bearing manufacturers. Although they would further lower bearing drag, by not incurring sliding contact between the rolling balls and conventional sliding contact ball separator cages, they are not preferred for the present invention because they are not standard parts, and friction drag of ball bearings with sliding surface ball separators from multiple manufacturers is acceptably low. They would increase ball bearing cost and complexity; and diameters relating dimensions of all rolling elements prescribed by kinematic considerations must be observed, for such rolling contact ball separator cages to properly function. Equations governing relative dimensions of parts in said bearings, based upon kinematics, are explained in my U.S. Pat. Nos. 6,566,775 and 6,794,777.

Bearings 6 and 7 in FIG. 1 are preferably deep groove or angular contact ceramic ball bearings. In FIG. 3D, axial force 307 is applied to the ball bearing inner race 301 preferably by a coil or wave spring. Inner race 301 is free to slide axially while constrained radially by center shaft 304, whose center is denoted by axis 305. It causes equal opposing axial force 308 to the ball bearing outer race 302, tending to push respective inner race 301 and outer race 302 apart. Resulting outer and inner race relative movement is constrained by ball 303 therebetween, causing reaction forces 309 and 311 between inner race 301 and ball 303, and equal opposing reaction forces 310 and 312, between outer race 302 and ball 303. Note that force 308 produces augmenting rotor lift force resulting from force 307.

When outer race 302 rotates about central rotor axis 305, with inner race 301 held so that it does not rotate by center shaft 304, ball 303 rolls about its roll axis 306. Note that roll axis 306 is inclined at an exaggerated angle A, from the vertical (no axial preload) roll axis of ball bearings named "2-point contact" by the ball bearing manufacturers. Since forces 309 and 311 are each equal to force 307 divided by the sine of angle A, bearing preload forces 309-312 resulting from applied force 307, could be much higher than the applied axial preload force 307, if angle A is very small. Angle A is difficult to control, for a "2-point contact" ball bearing, since it depends so much on ball-to-race clearance, unless "axial and radial play" (clearance) is large compared to ball and race dimension tolerances.

Ball bearings named "4-point contact" and those named "angular contact" would be very good options. Those named "4-point contact" (with no preload) are so named because the balls nominally contact the inner race at 2 points and the outer race at 2 points. It results from deeper race grooves at their axial centers, and a substantially constant radius larger than the ball radius, near each side of the races. Its main advantage, for achieving long bearing service life, is that the ball contact angle is initially more than a few degrees at each of the 2 contact points at the inner race and 2 contact points at the outer race. So bearing contact angle is never virtually zero (with resulting very high and variable contact stress from axial loads). Also, with radial loads near the rated limit, the balls would roll along 2 tracks on the inner race and 2 tracks on the outer. So this bearing type is capable of supporting almost double the radial loads of single track contact ball bearings. Angular contact ball bearings would accommodate even more precise axial preload, because initial contact angle A (with no axial preload) can be about 450 for them. But radial load limit, with only one track, and with that track at angle A, would be only about half that of "4-point contact" ball bearings. Since steady-state radial load on both ball bearings, for the present invention, is essentially zero, 4-point contact ball bearings are a preferred option, and angular contact ball bearings are a less suitable option. Note that, with all balls very round and having identical diameters, a consistent axial preload will result in each ball subjected to the same conditions at all times, and will maintain perfect inner and outer race concentricity if both races are perfectly round. This attribute applies even when bearings have large axial and radial play. Therefore, it is important that the ball bearings be highest quality.

Besides preventing ball pass vibration, the consistent axial preload of the present invention helps to prevent pounding the balls due to slight rotor mass unbalance during high-speed spinning: Instead of pounding the very hard but brittle ceramic bearings, the radial forces from rotor unbalance will cause the ball contact angles to wobble with rotation.

Because steel races have a lower modulus of elasticity than the ceramic balls that roll against them, ball contact areas are larger during higher contact forces due to more elastic steel races, and therefore pressure on the very hard ceramic balls at critical contact with the races is lower.

Flywheel battery service life is limited more by its two ball bearings than any other component of the present invention. So all means to reduce bearing failure modes are necessary. After the best bearing type is selected for this flywheel battery application, and all lubricant, handling and contamination precautions are heeded, optimum axial preload can eliminate ball skip, bounce, slide, and ball pass vibration problems. Rolling friction should also be minimized by preventing ball squeeze and release cycles. Less rolling friction decreases flywheel battery idling losses, and it decreases bearing heat that must be dissipated.

FIG. 3E is intended to help explain ball pass vibration, which results from balls like 303A with only its centrifugal force against outer race 302, rolling to ball 303B position, where it also supports the bearing radial load, which subjects it to the compressive forces shown between inner race 301 and outer race 302. The cyclic stresses, caused by sequential balls passing through ball 303B position, where it is compressed, can excite vibration at a frequency equal to the number of balls in each ball bearing times the rotor spin rate. If perfect rotor balance and perfect leveling could be achieved, such cyclic stresses would be negligible. But for most flywheel battery production process rotor balancing procedures and for most flywheel battery installations, radial load must be considered. And even the Earth's rotation around its axis induces a small precession torque tending to tilt the rotor spin axis, which must be countered by the ball bearings. The axial preload shown in FIG. 3D prevents ball skips, caused by temporary non-contact (shown by ball 303A in FIG. 3E) and subsequent contact with a bearing race. The subsequent contact may induce bounces and may be a sliding contact until compression forces prevent sliding. That process, without axial preload to prevent it, could occur with every rotor revolution, and drastically shorten bearing life.

Since forces, spin axis, and constant contact, for all the balls, represented by ball 303 in FIG. 3D, resulting from the axial preload, do not vary with outer race 302 rotation, no ball pass vibration will be induced, and ball skips, bounces, and sliding are prevented. To the extent that the ball bearing is subjected also to radial load, ball pass vibration is measurably and substantially reduced, because the ball compression cycle is reduced. Moreover, ball skips, bounces, and sliding are eliminated by the axial preload shown. So resultant nicks, scrapes, and scratches should be substantially reduced. And thus, ball bearing life should be greatly extended.

With axial preload and sufficient ball clearance, 4-point contact ball bearings will ideally roll with balls that make contact at only one point with the outer race and one point with the inner race. That will reduce rolling friction drag to about half the amount incurred by 4-point contact. And when occasional high radial loads may occur, they are expected to restore 4-point ball contact, and thus restore the high radial load rating of 4-point contact ball bearings.

Note that, if the springs in FIG. 3A-C provide axial preload of, for example, 5 pounds, when compressed about 1 inch ±0.05 inch, the preload, with said tolerance, would vary ±0.25 pound. That is because a spring flexed within its elastic range opposes that flexing by a force proportional to the movement causing it. Axial preload shifts the ball contacts with cooperative inner and outer bearing races by a small amount (depending on initial ball and race clearances, specified as radial and axial play), so it will slightly reduce maximum radial load rating for the bearing. Clearly, all balls must be precisely spherical and of very uniform size. Various allowable dimensional tolerances are specified by ABEC (Annular Bearing Engineers' Committee) standards, where ABEC-1 is the least precise and lowest cost, and ABEC-7 is more precise and higher cost. Since my present flywheel invention preferably includes bearings with minimal grease or oil lubricants, highest precision is needed, mainly to insure that all balls are evenly loaded. Modestly higher ball bearing cost, relative to total flywheel system cost, would be a prudent design compromise. Another advantage besides lower cost, of including only 2 bearings in the flywheel assembly of the present invention, instead of the normal preloaded 2 matched pairs, is that the present invention will not incur failures due to stresses and vibration from radial eccentricity between one bearing of the preloaded pair and its adjacent preload bearing.

Clearly, the rotor must be very well balanced, so that the ball bearings are not pounded and thereby damaged by vibration otherwise caused if rotor mass center does not coincide with the geometric center of the ball bearing inner races. For early prototype flywheel batteries, rotor balance will be preferably and most practically achieved by carefully balancing each annular rotor assembly part and careful balance adjustment after assembly, preferably performed by skilled and experienced rotor balancing specialists, using highest quality specialized balancing equipment. For production quantity flywheels, self-balancing by spinning the rotor beyond its resonant speeds while an elastomeric layer around the outer races cures is a likely option.

Other parts handling and production procedure and facilities considerations include inadvertent bearing contamination during assembly. So bearings having shields will be preferable to unshielded bearings, unless assembly and setup is performed in a clean-room environment. Sealed bearings would preferably be avoided, because they would add to friction drag and reduce thermal conduction, whereas bearings having shields substantially covering the balls and raceways have no sliding surfaces because a nominal 0.005 inch clearance with one raceway for each of the two shields (one shield on each side of the bearing, attached to only one race) is usual practice by bearing manufacturers. Although bearing specifications applicable to similar uses are not easy to find, and vary widely, empirical data and general formulas are available, to predict speed and load limits, plus drag loss and expected service life. General guidelines seen by inspecting numerous bearing descriptions by various bearing manufacturers, indicate that speed limits vary inversely with bearing diameter, and load limits vary in proportion to many factors, including material stress limits and ball size (which sets contact area and hence rolling contact stress).

Since grease and oil lubricants deteriorate with age, boil off and evaporate in a vacuum, and add viscous drag that would increase idling losses, such lubricants are preferably avoided for ceramic ball bearings included in my present invention. Bearing heat is a factor, and thermal considerations become very significant. A calculation based on bearing test data is presented herebelow, which provides insight into idling loss and bearing heat-sink requirements:

For a contemplated ball bearing with a 20-mm inside diameter, estimated rolling friction torque is quoted by bearing manufacturers at about 1 gm cm. Since virtually no lubricants are applied between the balls and races, viscous drag is neglected in the computation below.

Thus, bearing loss at a maximum 10,000 rpm (revolutions per minute) rotor spin speed, (for 2 ball bearings) would be about:

$$P_{loss}=(2 \text{ gm cm})\times(10000 \text{ rev/min})\times(6.28/\text{rev})\times(\text{min}/60 \text{ sec})\times(\text{watt sec}/10197 \text{ gm cm})$$

So rolling friction drag loss, dissipated in 2 ball bearings=$P_{loss}$=0.2 watt Although this indeed would result in a minimal-loss bearing, it indicates that preferences such as steel ball bearing races (especially an inner race that conducts heat to a cool aluminum or stainless steel center shaft), would provide considerably higher heat transfer than radiation in the intended vacuum, so steel races are preferred for my present invention, for several reasons. As a practical procurement consideration, ceramic ball bearings (often named hybrid ceramic ball bearings when races are steel) are available more widely than those with ceramic balls and races. Dissipating 0.1 watt per ball bearing by mainly thermal conduction from the inner and outer races will normally not cause excessive ceramic ball bearing temperature.

Service lifetimes for bearings are predicted from a bearing industry standard convention equation, which includes many factors. Its main calculation is shown here, which assumes bearings will not be mishandled during all procedures including packaging the flywheel assembly in a vacuum environment. This equation first computes total revolutions N before 10% of ball bearings probably fail from fatigue, according to an industry standard Weibull Distribution.

Although such service lifetime data is not available for the ball bearing application described herein regarding the present invention, calculations presented below are intended to be instructive and representative for configurations and physical conditions set forth herein.

$$N(\text{revolutions})=(10^6)\times[(\text{load force rating})/(\text{sustained load})]^3$$

The sustained load is essentially due to the bearing preload, which is 7 pounds maximum ball contact force, for a consistent 5-pound axial preload.

A conservative radial load force rating quoted by bearing manufacturers is about 500 pounds. Thus: $N=(10^6)\times(500/7)^3=36*10^{10}$ revolutions with 10% failure probability, 0.2 N revolutions with 1% failure probability. Then predicted 90% survival confidence over the N revolutions service life, spinning constantly at 10,000 rpm, is computed from:

$$\text{Service life}=T=(36*10^{10} \text{ rev})\times(\text{hr}/60 \text{ min})\times(\text{day}/24 \text{ hr})\times(\text{yr}/360 \text{ day})/(10000 \text{ rev/min})$$

So: T=70 years probable service life with 90% bearing survival confidence, and 14 years with 99% survival confidence, based on typical bearing data and minimal rotor unbalance, with a consistent 5-pound axial preload that results in a 7-pound maximum ball contact force.

However difficult to achieve, perfect rotor balance, wherein the rotor mass center axis coincides with geometric rotor axis 305 in FIG. 3D, would result in a 5-pound axial preload divided by sin(A), evenly distributed over the number of balls in each ball bearing.

For safety reasons, and to minimize the high cost that would be incurred if a flywheel assembly were to explosively disintegrate, detecting imminent failure and responding promptly is crucial. A classic method of detecting imminent rotor rim disintegration, as well as mechanical or magnetic bearing failure, is by including accelerometers affixed to the flywheel assembly. A less expensive method, which consumes less power, is to monitor idling losses. Both methods are viable low-cost options, so including both is preferable.

With either method detecting incipient failure, power interface electronics would receive a motor inhibit command, and preferably also a regenerate command, so rotor speed would be gradually reduced to essentially zero if incipient failure is detected.

Sliding surface mechanical backup to the ball bearings could enhance flywheel safety and limit damage to other flywheel parts, in the event of ball bearing failure or extreme vertical shaking. It could be implemented by an additional annular part above the rotor and another beneath it. Said two annular parts are not illustrated in FIG. 1 because showing such close radial proximity to scale would confuse this illustration, and because their simple geometry can be adequately described here: Each of the two annular parts would be centered within ±0.001 inch, and have a nominal axial 0.050 inch clearance with cooperative outer sliding surfaces of rim holders 12A and 12B. Thus rotor axial excursions would be limited to 0.050 inch. That would prevent contact and resultant damage to parts such as stator assembly 10 and Hall sensor 19 affixed thereto, if the flywheel assembly drops (causing the rotor to move up relative to the stator), and to ring magnets 1 and 2, if the falling assembly hits bottom (causing even higher shock and axial deceleration, and the rotor to move down relative to the stator). Said two annular parts would have a nominal 0.005 inch radial clearance with respect to cooperative outer surfaces of rim holders 12A and 12B, thus providing a redundant journal bearing to constrain the rotor radially, which does not make contact with any rotor part unless a ball bearing were to fail. Sliding surfaces of said backup bearings would preferably be coated with a resilient, low friction material having high thermal conductivity.

Except for two Hall sensors that detect and provide rotor angle signals to power interface electronics of FIG. 5A-5B, all of the system's electronics is housed in a separate easily accessible enclosure, which interfaces with a DC power bus through respective positive and negative power terminals, labeled in the functional schematics FIG. 5A-5B.

Connections for both motor phases are shown in FIG. 5A-5B. For the preferred 2-phase motor/generator of my present invention, four high-current conductors to the stator windings, plus four low-current conductors, for Hall sensor ground, +5 vdc, and 2 Hall sensor output signal leads, connect power and feedback signals to respective power and signal processing circuits in the electronics enclosure, through a hermetic feed-through in a vacuum flywheel enclosure. Getters are preferably included therein, to absorb vacuum contaminants that may be expelled from parts therein over the long-term service life intended.

Electronic engineers understand problems and challenges caused by ground loops. Since the high-current stator winding conductors and low-current motor sensor conductors do not share any common connections in the present invention flywheel assembly, ground loop problems of active bearing systems are thereby obviated by the rotor bearings described herein. Clearly, only a total and complete flywheel battery system design, according to the present invention, accommodates such practical improvements over the prior art.

A preferred installation for this invention will include a conventional circuit breaker having a solenoid actuator with considerable inductance, connected in series between the electronics and the DC power bus. The circuit breaker will disconnect the flywheel battery from the power bus in the event of current overload or line short, thereby preserving all flywheel battery functions and stored energy. Circuit breaker inductance helps to reduce power-line spikes that could otherwise damage power semiconductors. When the fault causing the circuit breaker to open is corrected, and the circuit breaker re-closed, the flywheel battery will resume normal service.

All electronic circuits will be designed to operate over the full voltage range of the DC power bus. But voltage spikes may be injected onto the DC power bus from a lightning strike, or from a power grid that supplies the on-site DC power bus. Such spikes are usually very short duration (typically microseconds and not over a few milliseconds), and do no circuit damage if the DC bus voltage is clamped. In generator mode, the regenerative motor control electronics illustrated by FIG. 5A-5B includes voltage feedback plus over-voltage protection, so that it will not inject current onto the DC power bus that can result in power bus over-voltage. Electronic circuit and DC bus over-voltage will be prevented with sub-nanosecond response, by a transient voltage suppressor (TVS), similar to a large junction area zener diode. Current through the TVS will be sensed, to directly inhibit and turn off power semiconductors with sub-microsecond response, to prevent the electronics from injecting more current (supplied by the motor/generator) onto the power bus. Also, negative voltage feedback to the electronics, from the on-site DC power bus, normally limits current supplied to the bus from the electronics by means of a slower feedback loop, so bus voltage is prevented from rising above prescribed levels by two redundant means.

Customary H-bridge drivers, which control the 2 upper MOSFET or IGBT power switches, shown as UL and UR in FIG. 5B; which, cooperative with the 2 lower MOSFET or IGBT power switches, shown as LL and LR, control respective stator winding current; use charge-injection diodes to maintain a nominal +12 vdc charge on capacitors which supply the upper gate drive, relative to respective connections such as between UL and LL. Voltage there switches abruptly, substantially between the DC power bus and ground. Since said capacitor charging occurs only when UL and LL common voltage is at ground, and the charge-injection diodes may leak, the capacitors may not be fully charged when their respective driver signals apply gate voltages to turn MOSFET or IGBT switches fully on. Said switch can over-heat and cause semiconductor failure, due to substantial voltage across the partially conducting switch. The Intersil HIP4081A H-bridge driver IC includes a startup mode, with UL and UR OFF while LL and LR are ON, to charge these capacitors; plus a high-frequency internal diode-capacitor ladder, for maintaining the capacitor charge with 30 to 50 microamperes, to mainly offset diode leakage draining capacitor charge. But most H-bridge drivers do not include this feature.

Figure 6A:
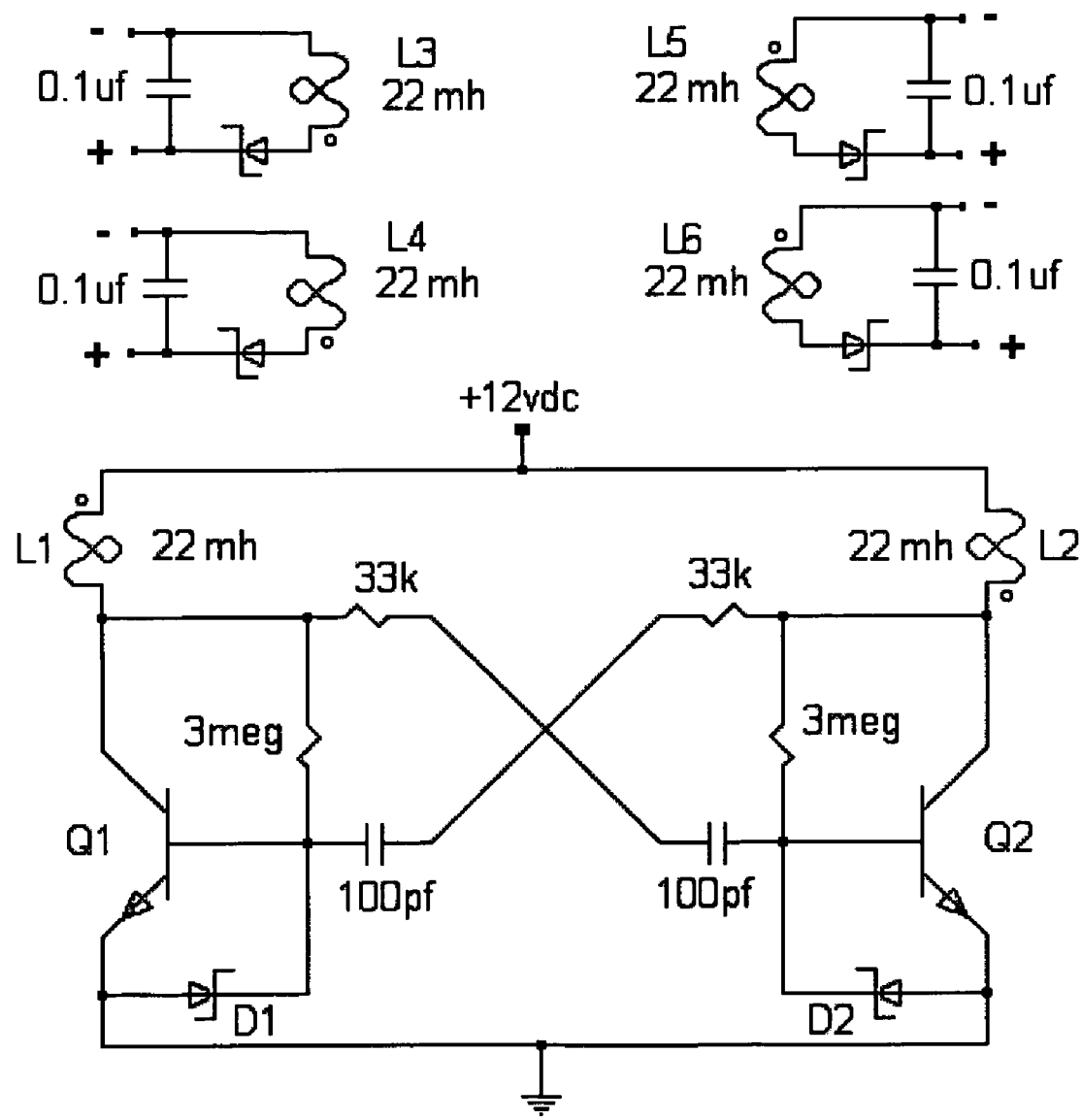
FIG. 6A illustrates a reliable, minimal-loss circuit, for providing 4 floating and regulated 12 vdc supplies, which sustain power for PWM drive to upper power switching MOSFET or IGBT semiconductors of 2 H-bridges which control 2-phase motor/generator stator winding current.

A very practical new circuit of my present invention, for insuring that said capacitors are always fully charged to +12 vdc, is illustrated in FIG. 6A, whose oscillator, comprised of npn transistors Q1 and Q2, driven as an astable circuit, by cooperative resistors, capacitors, and diodes, will be familiar to electronic engineers. This circuit provides 4 floating +12 vdc supplies, by charging respective 0.1 uf capacitors, every 20 microseconds or so (at nominal 50 kHz oscillation frequency). Attention to winding detail, of the 6 coils L1-L6, is very important to reliable circuit operation. Said 6 coils are wound on a low-loss high-frequency ferrite core, each having an equal number of turns, so that each has inductance exceeding 22 millihenries, and equal square-wave voltage approximating 24 vpp across each coil. L1 and L2 are bi-filar layer wound first, to achieve very close coupling, preferably having a coupling coefficient of 0.999 or higher, to minimize voltage spikes on Q1 and Q2 collectors. Windings L3, L4, L5, and L6 should have very low capacitance between each other and to all other circuit elements, so that the floating 12 vdc they provide has negligible current from stray capacitance to all other circuit elements when it abruptly transitions with upper IGBT or MOSFET source connections, substantially between the DC power bus voltage and ground, as required by H-bridge PWM switching. This is most practically achieved by applying a low permittivity (for low capacitance) adhesive tape over the last bi-filar L1-L2 windings, and between winding L3, L4, L5, and L6, so each is insulated and has low capacitance between all the windings and their core. Note the coil phasing, denoted by the dots. And note phasing of coils L3, L4, L5, and L6, which charge two capacitors each oscillator half-cycle, so L1 and L2 coil currents are equal, when they alternately conduct, mainly through Q1 and Q2. This circuit provides reliable 12 vdc floating power for upper H-bridge driver ICs.

It is also important that none of the power semiconductors be driven to conduct, until all signal processing electronics is supplied power at the minimum voltage specified for each device. Those minimum voltages are specified in data sheets available for most integrated circuits. Most driver circuits, such as the IR2110 and HIP4081A, include under-voltage lockout, so that drive to gates is zero (OFF) unless signal processing circuits are provided a requisite supply voltage. This prevents damage to power semiconductors, which might otherwise be driven ON from erroneous signals. For the present invention, signal processing circuit power is supplied by a practical and very efficient regulated +12 vdc, −12 vdc, and +5 vdc supply. Since the −12 vdc and +5 vdc outputs closely track the +12 vdc output, the electronics of my present invention thus prevents power transistor turn-on until all signal processing circuit supplies exceed minimum operating levels for all control electronics.

Figure 6B:
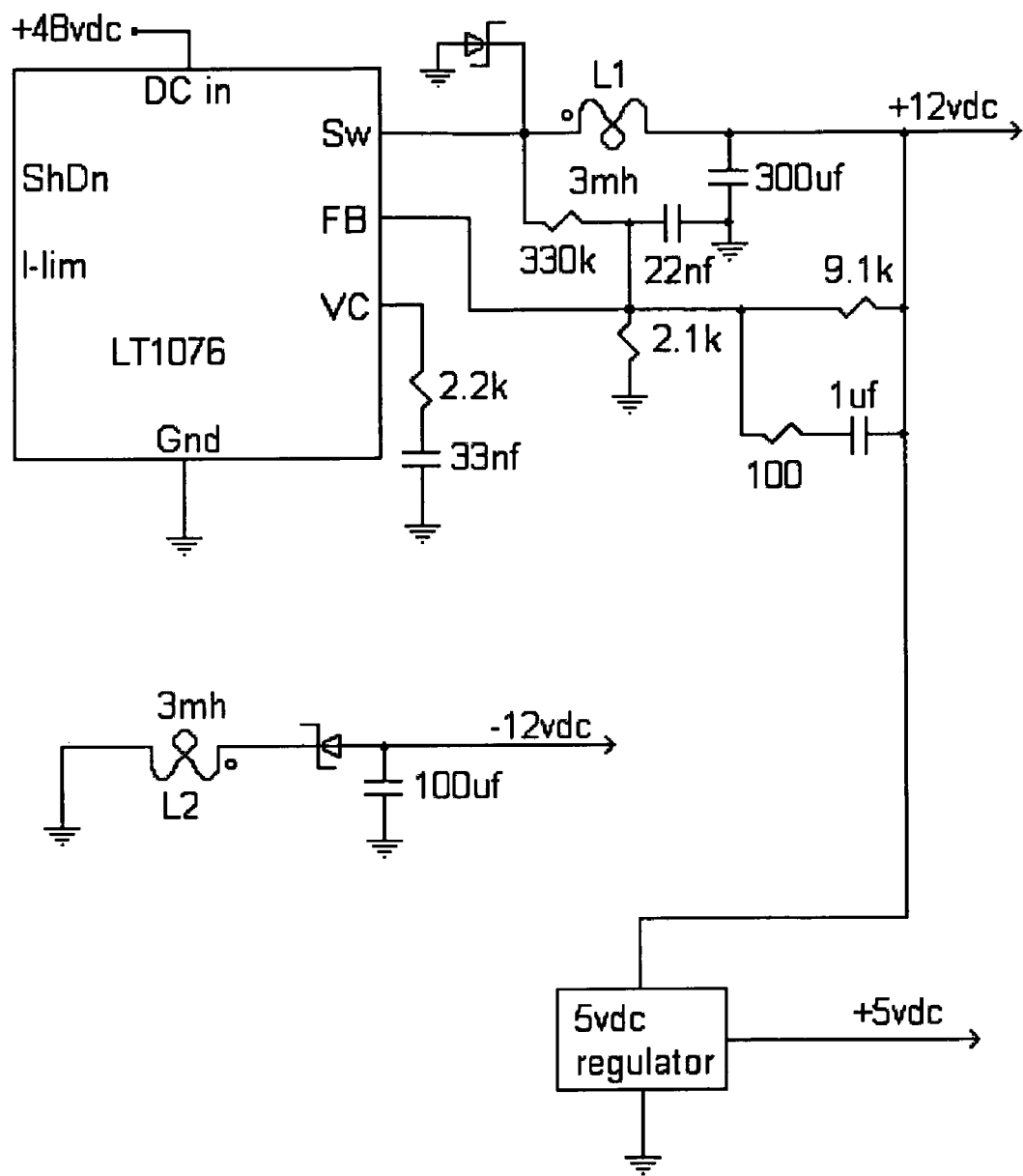
FIG. 6B illustrates a reliable, minimal-loss circuit, for providing +12 vdc, −12 vdc, and +5 vdc, for signal processing electronics and for motor/generator Hall-effect rotor angle sensors.

FIG. 6B illustrates a very cost-effective minimal-loss circuit, incorporating an integrated circuit 100 kilohertz PWM voltage regulator, to provide +12 vdc, −12 vdc, and +5 vdc. Linear Technology Corporation manufactures the LT1076 switch-mode buck regulator IC therein. Its input power is supplied at +48 vdc relative to ground, for a preferred embodiment of my present invention. The LT1076 has a 64-volt maximum rating. The +12 vdc output voltage is regulated closely, by feedback to the LT1076 reference FB, via resistive voltage divider 2.1 k and 9.1 k; with slope compensation to its FB pin, to improve switching, provided by the 22 nf capacitor and 330 k resistor. Lead/lag compensation and inrush limiting is provided by the 0.1 uf capacitor and by the 100 ohm resistor. Other similar ICs are available, having higher voltage ratings as needed.

To achieve a precise −12 vdc from the circuit shown in FIG. 6B, coils L1 and L2 must be very closely coupled. A 0.999 coupling coefficient was achieved experimentally, by very accurate bi-filar winding. Note relative coil polarities of L1 and L2, so that the 100 uf capacitor which filters the −12 vdc output is charged alternately with current charging the 300 uf capacitor which filters the +12 vdc output. Moreover, current to charge the 100 uf capacitor is supplied by the 330 uf capacitor, with input current from the 330 uf capacitor to L1 driving the 100 uf capacitor through L2. Steady-state L1 coil current must exceed the current pulses delivered by L2 to the 100 uf capacitor. This is practical to achieve, because the steady-state current load on the +12 vdc supply is considerable higher than the current load on the −12 vdc supply. Note that the +12 vdc supply provides current for the 4 floating 12 v supplies shown in FIG. 6A, and for the +5 vdc voltage regulator that supplies current to the 2 rotor angle Hall sensors, and to the 2 stator current sensors. The new circuit shown in FIG. 6B provides a practical, reliable, minimal-loss, low-cost circuit improvement over the prior art, that is enabled by careful attention to total electronics and flywheel battery system design details, along with subsystem fabrication details, as herein described.

Figure 7:
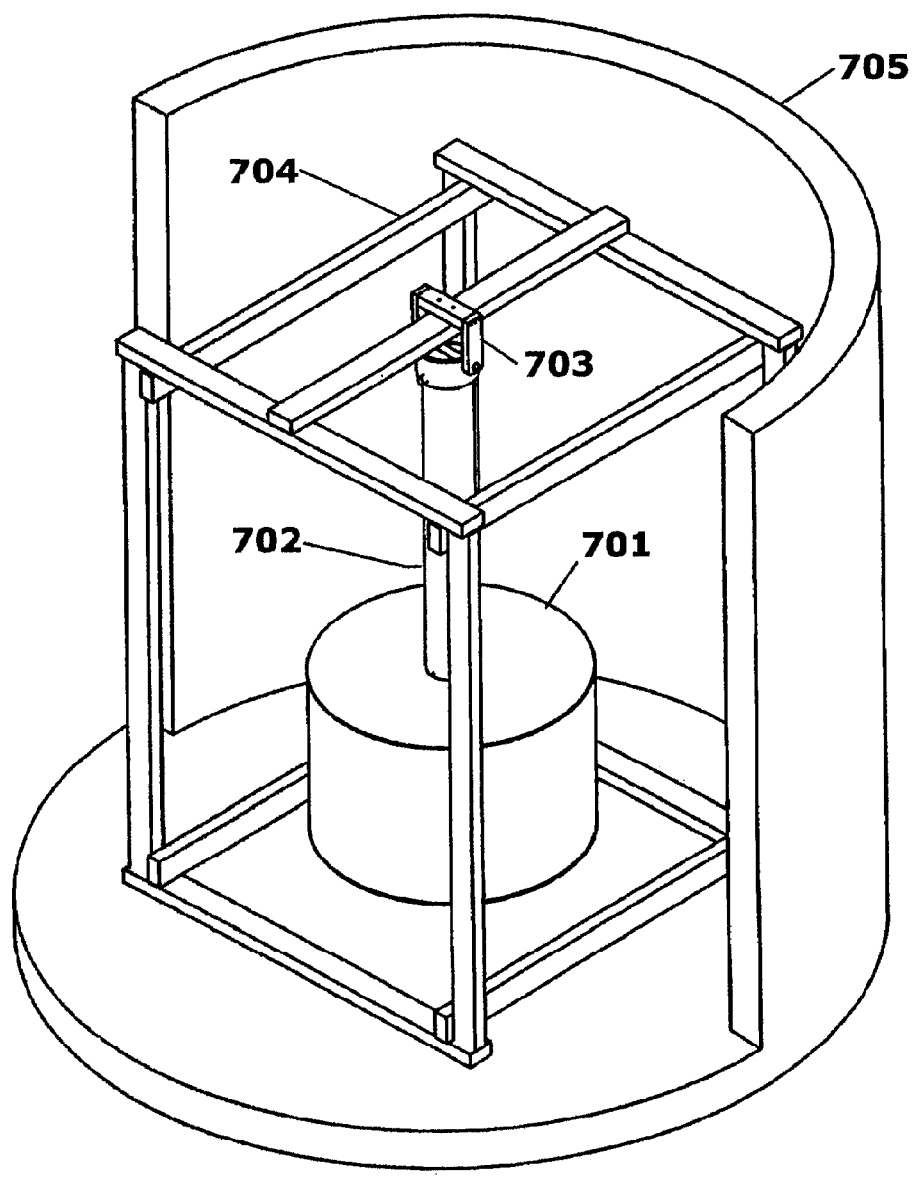
FIG. 7 illustrates a cutaway view of an on-site flywheel assembly within a vacuum enclosure, hanging from a 2-axis gimbal, for self-leveling, supported by a frame structure.

FIG. 7 illustrates a preferred embodiment of the flywheel assembly vacuum enclosure 701, rigid support and wire conduit cylinder 702, top 2-axis gimbal means 703, support frame 704, and frangible surrounding liner and installation enclosure 705.

Vacuum enclosure 701 contains all flywheel assembly elements, and is substantially larger than the flywheel assembly therein, to better maintain vacuum in empty spaces inside it, after it is sealed. A rudimentary fluid dynamics analysis shows that viscous drag increases with gas pressure; and that the enclosure must maintain a vacuum equivalent to about $10^{-6}$ atmosphere, for viscous drag power loss to be less than magnetic hysteresis and eddy current idling losses. A larger interior volume would better maintain its vacuum despite outgassing from parts within it. For those reasons, enclosure 701 diameter and length should be considerably greater than the outer dimensions of the flywheel assembly shown in FIG. 1. The center of mass, of the flywheel enclosure and its contents, should coincide with its geometric center, to facilitate self-leveling.

Atmospheric pressure on the vacuum enclosure causes higher stresses with the preferred large size and relatively thin wall compared to most other prior art flywheels, but finite-element-analysis indicates said stresses will be negligible at all locations of the enclosure material.

Eddy currents in an aluminum vacuum enclosure will indeed be negligible, since virtually no stray magnetic flux cycling can occur, mainly because the motor/generator magnetic field is constrained to the space occupied by the cooperative axial segments of the stator windings, by the inner and outer rotor iron, and secondly because distance between the motor/generator and the enclosure is large for the present invention. Clearly, the magnetic field from the axial support magnets (1 and 2 in FIG. 1) does not magnetically cycle the enclosure material, stationary parts within it, or parts affixed to the rotor, because said magnetic field is axisymmetric.

With reference to FIG. 1, to minimize outgassing during a required long service lifetime, resins in parts such as the stator winding assembly 10, possible polymers to dampen rotor vibration, and rims made from fiber composite materials, should be cured slowly at recommended temperature in vacuum. After all component parts are assembled and affixed within the vacuum enclosure, further purging of contaminants on the surfaces of all parts within the vacuum enclosure, and on the inner surfaces of the vacuum enclosure, will be performed by drawing a vacuum of about $10^{-6}$ atmosphere and holding that vacuum along with an elevated temperature for a few days. The vacuum enclosure should only then be sealed, after adequate purging.

In the event that vacuum loss is detected at some future time after underground installation, the vacuum enclosure could be evacuated again, without lifting the flywheel assembly from its site underground, by including a sealable copper or aluminum tube that extends from the vacuum enclosure to a convenient surface location. By coupling said tube to a vacuum pump, the vacuum could be restored, and then the tube re-sealed.

The flywheel rim may also be fabricated from magnesium or titanium alloys. Although these solid metals are heavier than fiber composites (and some fiber composite developers claim fiber composite materials having higher tensile strength than these alloys), production processes to minimize later long-term outgassing could be simplified with the metal rims. And early production costs could be considerably less. Such design trade-offs are familiar to all engineers.

The 8 electrical connections to the motor stator wires and Hall sensors exit enclosure 701 shown in FIG. 7 via a hermetically sealed connector, then brought up via flexible conductors inside rigid cylinder 2, which holds enclosure 701 in a level position by hanging it from gimbals 703 affixed to frame 704 The gimbals prevent rotation about a vertical axis parallel to the rotor spin axis, while they allow cylinder 702 to pivot freely about horizontal axes 90.degree. apart. Thus, if the frame 704 is installed so a first pivot axis affixed to it is not level, said first pivot axis will accommodate rotation within a plane perpendicular to a level plane, so a second pivot axis 90.degree. from the first pivot axis, will lay in a level plane, maintained there by gravitational force on the flywheel assembly center of mass. Then, said second pivot axis will accommodate rotation so the flywheel assembly center axis, and with it the rotor spin axis, is always vertical. Frame 704 is supported by outer liner 705, which is preferably supported by ambient soil beneath it, and surrounded by materials such as sand, shredded tires, shredded carpet, and the like, which can absorb energy due to improbable but possible uncontrolled energy release due to flywheel rotor disintegration, over as large a volume as practical. Outer liner 705 is comprised of a frangible material, not intended to contain such an energy release; its purpose instead is to provide a relatively clean, preferably underground, housing for flywheel battery components 701-704.

It will be understood that self-leveling is hereby achieved, as illustrated in FIG. 7, by the above described combination of elements, and a level vertical-axis flywheel assembly maintained despite possible movement of soil or structure supporting outer liner 5.

Those versed in gyrodynamics will understand that the Earth's rotation of one revolution each day will cause the flywheel rotor to precess about its spin axis at one revolution per day, and thereby exert via the ceramic ball bearings, center shaft, and all flywheel assembly support structures, a precession torque tending to tilt the flywheel assembly away from its level vertical spin axis position. Said precession torque is readily computed from the equation:

Precession Torque=(Rotor Moment of Inertia)*(Rotor Spin Speed)*(Earth Rotation Rate)

The equation below is familiar to all versed in the fundamental relations between kinetic energy stored in a flywheel, its rotor assembly moment of inertia, and spin speed:

Flywheel Energy=(½)*(Rotor Moment of Inertia)*(Rotor Spin Speed)$^2$

Combining the above two equations results in an expression which directly relates to flywheel battery parameters and design details of the present invention:

Precession Torque=2(Flywheel Energy)(Earth Rotation Rate)/(Rotor Spin Speed)

From the above equation, note that for a given flywheel kinetic energy storage requirement and Earth rotation rate, precession torque is inverse to rotor speed, which in the present invention is limited by ball bearing speed limits. Generally, small ball bearings have higher speed limits than large ball bearings. But small bearing have lower axial and radial load limits. Therefore, optimum flywheel assembly design, to minimize ball bearing radial load due to Earth rotation, requires placing the bottom and top ball bearing as far apart as practical. Consistent with this design detail, the rotor rim has axial dimensions compared to its outside diameter, which are higher than most flywheels. For example, flywheels intended for space vehicle power storage and regeneration, which additionally are intended to control the space vehicle pitch, yaw, and roll as Control Moment Gyros, would have higher diameter-to-axial dimension ratios. This consideration and other factors intended to optimize flywheel systems for electric power storage and regeneration plus pitch, yaw, and roll control of space vehicles, is taught in my U.S. Pat. No. 6,794,777. Its desired gyroscopic attributes are opposite the present invention, in that it applies precisely controlled precession torque to achieve desired resulting space vehicle precession rate.

Applying the equation above to a representative flywheel battery, according to the present invention, which is spinning at 10,000 rpm to store 5 KWH energy:

$$\text{Precession Torque} = 2(5000 \text{ WH})\left(\frac{1 \text{ rev}}{24 \text{ H}}\right) / (10000 \text{ rev/min})$$

$$(\text{min}/60 \text{ sec})$$
$$= 2.5 \text{ W sec}$$
$$= 2.5 \text{ joule}$$
$$= 2.5 \text{ ntn meter}$$
$$= 1.8 \text{ pound feet}$$

that tends to tilt the rotor assembly. Top and bottom ball bearings then must react with opposite radial forces, resulting in an opposing tilt torque equal and opposite this precession torque. Clearly, the furthest practical axial distance between ball bearings 6 and 7 (see FIG. 1) will result in the least radial loads imposed on them. A 24-inch distance is practical, for this representative example, so the radial loads on each of the two the ball bearings will be (1.8 pound ft)/2 ft.

This amounts to less than 1-pound constant radial load on each of the two ball bearings, with resultant radial thrusts on the top and bottom bearings in opposing directions. It is not negligible, and it must be carefully considered within the context of the ball bearing axial preload and service lifetime analyses hereinabove. Moreover, the 1.8 pound ft tilting torque is transmitted by the ball bearing inner races, to the flywheel stationary parts. It will affect the self-leveling means, as computed below.

For a 400 pound total flywheel weight, with center of mass 4 feet below the support gimbals, the self-leveling torque will be =(400 pound)(4 ft)*sin(tilt angle) and will equal the 1.8 pound ft precession torque computed above. Therefore:

Sin(tilt angle)=(1.8 pound ft)/(1600 pound ft)=0.0012

Therefore, the tilt angle will be approximately 0.1 degree. Tilt off vertical causes radial thrust loads on ball bearings 6 and 7, both thrusts in the same direction, with their combined radial loads due to tilt equal to:

(rotor assembly weight)*sin(tilt angle)=(100 pound)*(0.0012)=0.12 pounds, for this representative example.

Although this negligible radial force is small, compared to the bearing radial forces caused by Earth rotation, it should be noted that it slightly increases the radial force on the top ball bearing and slightly decreases the radial force on the bottom ball bearing. This interesting result is because the 0.12 pound radial force due to tilt is in the same direction and shared by both bearings, while the two (1 pound each) forces caused by precession torque of a spinning rotor are in opposite directions.

For typical flywheel batteries, having a hanging cylinder 702 whose length exceeds that of enclosure 701, and typical rotor moment-of-inertia to weight ratio, angle of departure from level less than 1 degree should not be troublesome. More substantial tilt could shorten ceramic ball bearing service lifetime; and prior art flywheel batteries that have radial electromagnets for centering would incur considerable idling losses. Flywheel battery installations near the Earth's North or South poles would incur negligible precession from Earth rotation about its axis. Although chemical batteries would have serious problems at such extreme low temperatures, flywheel batteries should perform well in such locations.

A preferred flywheel enclosure installation site, for the flywheel assembly and support structure shown in FIG. 7, is in a cylindrical hole prepared for this purpose. The hole will preferably be dug during building construction, in an area planned to be covered by a reinforced concrete slab floor, for a parking or storage area, prior to pouring concrete for that area's floor. Back-fill is then poured outside outer liner 705, and compacted to support outer liner 705, which protects and maintains a clean space for the flywheel enclosure, and conduit connecting it to wall-mounted associated electronics, in an accessible area constructed above the floor.

Liner 705 also facilitates a clean installation environment over a long service life, for the flywheel assembly in its enclosure and the electrical conduit to the power interface electronics, and otherwise possible inadvertent damage from building construction activity. Permeable back-fill will surround the liner, and help to support the concrete slab floor poured above it, around an annular insert having a removable (with special tools) steel cover plate fastened thereto. Back-fill materials are intended to absorb possible explosion energy over a large volume. The back-fill is preferably a porous sand mixture, which is readily available at construction sites, is low cost, is not flammable, not degradable, and can absorb an explosive blast without a high pressure reflected shock wave. The concrete slab, and the cover plate over the flywheel enclosure, should provide an effective barrier, to protect people in and around the building, and prevent damage to the adjoining building in the event of a possible exploding flywheel.

Associated electronics, shown in FIG. 5A-B, connected to the flywheel enclosure by a flexible electrical conduit having protective metal armor around it, is preferably housed in a single wall-mounted cabinet. This provides convenient access for viewing its data monitor at the cabinet front, and for setting command variables like startup, shutdown, time-of-day power storage, power-down, and possible power schedules for discretionary loads. It also provides a clear air-flow path, to maintain cool electronics in the cabinet by air convection with filtered air.

Installed as set forth herein and illustrated in FIG. 7, the flywheel assembly vacuum enclosure 701 need not be capable of containing a possible flywheel explosion. Enclosure 701 is preferably constructed of light thin-wall metal, such as aluminum, mainly because it will outgas far less than many other materials, can be fabricated to high precision tolerances, and can withstand possible bumping and scraping during assembly and handling procedures without damaging its structural or interior vacuum integrity. A preferred embodiment will contain absorptive and adsorptive getters in the enclosure, to help maintain its interior vacuum. Flywheel safety can be further improved by the rotor sliding surface backup bearings that do not normally make contact, and by accelerometers attached to the flywheel assembly to sense vibration and initiate shutdown if excessive vibration is detected. Control and status display is implemented by FIGS. 5A-B power control electronics.

New flywheel battery configurations and combinations, provided by the present invention and set forth herein, include:

(1) Means that facilitate a cost-effective vertical-spin-axis zero-maintenance long-life flywheel battery, which converts electric power to kinetic energy and regenerates power therefrom as needed, preferably by a 2-phase multi-pole motor/generator whereby, for each stator phase:

Voltage is substantially sinusoidal, having peak amplitude and frequency proportional to rotor spin speed. Torque is proportional to the product of stator current and flux density at the stator winding axial segments, and for one phase varies according to $\{\sin^2(\text{rotor angle})\}$.

For the other phase, sine terms are replaced by cosine. So the sum of torque from the two phases, in both motor and generate modes, is proportional to $\sin^2(\text{rotor angle}) + \cos^2(\text{rotor angle})$ which has negligible torque ripple. Power electronics sums current through the two phases in accordance with the same relationship, and thereby exchanges DC current that is substantially free of ripple, with the DC power bus.

(2) A repel mode magnetic bearing axial support for a vertical spin-axis flywheel rotor, axially centered by ceramic ball bearings that are axially positioned a maximum practical distance apart to minimize bearing radial load from rotor precession torque due to Earth rotation.

(3) Means for applying a consistent ceramic ball bearing axial preload, that also provides axial lift force to help levitate the rotor assembly, and radial compliance to high rotor speed unbalance motion, thereby preventing high radial swirling forces on the ball bearings.

(4) Self-leveling means for a preferably underground flywheel assembly.

(5) A low-cost circuit that reliably and efficiently provides 4 floating 12 v supplies, to ensure that upper H-bridge MOSFET or IGBT power switches, when switched on, have low conduction losses enabled by their maximum conductance, so they do not fail from over-heating.

(6) A practical low-cost circuit that provides regulated +12 vdc, -12 vdc, and +5 vdc outputs, for the flywheel battery electronics and rotor angle Hall sensors.

(7) A lower cost motor/generator configuration, that provides a near sinusoidal radial magnetic field pattern for interacting with the stator winding currents, and radial magnetic field pattern above the magnets, which is detected by 2 Hall sensors affixed to the stator winding assembly, to provide rotor angle feedback to the power interface electronics with phase corresponding to each stator winding voltage induced by rotor spin.

(8) Power transistor turn-off delay of one transistor in each H-bridge diagonal pair, during motor drive mode, to minimize H-bridge power losses and maximize motor efficiency.

(9) Power transistor turn-on delay of all transistors in the H-bridge, when transitioning between stator current polarity, and when transitioning between drive and regenerate modes.

(10) Accurate minimal-loss stator current sensing, to provide negative current feedback signals for each phase, proportional to the absolute value of stator current, for minor loop current control of desired current, by PWM (Pulse Width Modulation).

(11) Circuit means for producing from analog signals high-switching-frequency pulse-width-modulation H-bridge power switching transistor on/off gate drive.

(12) Fail-safe sliding surface backup rotor bearings, and shutdown initiated if excess vibration is sensed, by power control electronics that also display rotor speed and system status.

(13) Over-voltage-protection means, which prevents excessive voltage on all electronics.

(14) Means for holding the rotor rim and motor iron and magnets, with minimum concentricity and diameter tolerance error buildup, which also provides shock absorbing and vibration damping.

It will be understood that this invention may have many variations in addition to those described by example herein, with appropriate embodiments of constituent elements herein described to best suit a particular situation. Accordingly, it is intended that the claims as set forth hereinafter cover all such applications, embodiments, and variations thereto within the true spirit and scope of this invention.

I claim as new and an improvement to the prior art, and desire to secure by Letters Patent:

1. A flywheel battery, for storing electric power from a DC power bus as kinetic energy and regenerating electric power with minimal losses, comprising:

motor/generator means in a flywheel assembly, including poly-phase stator windings for conducting poly-phase sinusoidal currents, the windings formed from multi-strand insulated conductors for eddy blocking and bucking, cooperative with a juxtaposed alternated-pole permanent-magnet array affixed to rotor iron for providing radial flux that interacts with said currents, and rotor angle sensors each aligned with a respective stator winding phase, for providing poly-phase feedback signals that vary essentially sinusoidally with rotor angle;

power interface electronics, with H-bridges connected to the DC power bus and to the poly-phase stator windings of the motor/generator, said electronics responsive to the rotor angle sensors and to the DC bus voltage, for controlling by pulse-width-modulation poly-phase current through the stator windings so its resultant magnetic field rotates synchronously with the rotor;

a flywheel rotor having a vertical spin axis, supported by bearing means comprised of repelling annular axial-field magnets centered by two ceramic ball bearings, including axial preload springs that augment the axial support of said axial-field magnets, the rotor including rotary inertia for storing kinetic energy, plus rotor elements of the motor/generator;

a vacuum enclosure, containing mounting therein for the flywheel assembly, and hermetic connections to the power interface electronics outside the enclosure; and a housing and support structure, for the vacuum enclosure and flywheel assembly therein;

wherein said bearing means further comprises:

a stationary annular permanent-magnet, affixed to a cylindrical support that maintains precise centering around a center shaft, within and supported by the vacuum enclosure, to provide an axial magnetic field uniform with rotor angle, beneath the rotor assembly;

a like rotatable annular permanent-magnet, affixed to the rotor assembly and precisely centered around said center shaft by upper and lower ball bearings, this permanent-magnet juxtaposed above said stationary annular permanent-magnet, and having an opposing axial magnetic field so that the two magnets repel each other, to provide a stable axial lift force for supporting the flywheel assembly weight;

a first ceramic ball bearing near the top of the rotor assembly, having a slip fit around the center shaft and its inner race, and a slip fit around its outer race with an axial restraint, so that the ball bearing can slide axially with the rotor while it maintains precise rotor centering and augments the rotor axial support;

a first axially compressed annular spring to provide axial lift force to the first ball bearing inner race, for providing consistent axial preload and also for providing flexible rotor lift;

a second like ceramic ball bearing near the bottom of the rotor assembly, having a slip fit around the center shaft and its inner race, and a slip fit around its outer race with an axial restraint, so that the bearing can slide axially with the rotor while it maintains precise rotor centering and augments the rotor axial support; and a second like annular spring to provide axial lift force to the second ball bearing inner race, for providing consistent axial preload and also for providing flexible rotor lift.

2. The flywheel battery of claim 1, wherein said power interface electronics further comprises:

signal processing means, responsive to Hall-effect rotor angle sensors corresponding to each poly-phase stator winding phase, each Hall-effect sensor aligned with a respective stator winding phase so the sensor output signal is in phase with the corresponding stator winding voltage, and responsive to the DC power bus voltage and input commands, for controlling pulse-width-modulated H-bridge power switches; and H-bridge power switches, responsive to the signal processing means, connected across the DC power bus, and through series output inductors to respective motor stator windings, including diagonal pairs of switch-mode transistors, for efficient sinusoidal poly-phase stator winding current control, and for exchanging DC current with the DC power bus.

3. The flywheel battery of claim 1, wherein said motor/generator further comprises:

poly-phase stator windings, embedded in a stator winding assembly, formed from multi-strand conductors that provide means for blocking and bucking eddy currents therein, for producing torque between the rotor and the stator, and for exchanging electric power with the power interface electronics with minimal eddy current losses;

multiple pairs of rectangular motor magnets, supported in the outer cylinder rotor iron, with one magnet of the pair magnetized radially outward and the other magnetized radially inward, to provide a radial magnetic flux pattern which varies substantially sinusoidally with rotor angle, through the cooperative stator winding axial segments in the radial magnetic flux;

rotor angle sensors, each aligned with a respective stator winding phase and affixed to the stator winding assembly, responsive to the peripheral magnetic field of the motor magnets, for providing poly-phase feedback signals which vary substantially sinusoidally with rotor angle;

an outer cylinder of high-permeability rotor iron, for supporting rectangular magnets affixed therein and for providing an outer magnetic flux return path; and an inner cylinder of high-permeability rotor iron, affixed to the outer cylinder, for providing an inner magnetic flux return path, and for completing through the stator windings a radial magnetic flux pattern which rotates synchronously with the rotor.

4. The flywheel battery of claim 1, wherein said poly-phase stator windings each further comprises a group of conductor strands, each insulated from the others between winding terminal connections, the group spiraled, to equalize, between winding terminal connections, voltage across each strand, and formed so magnetic field from its current does not significantly affect peripheral radial motor magnet field detected by the rotor angle sensors that provide rotor angle feedback signals to the power interface electronics.

5. The flywheel battery of claim 1, wherein said motor/generator has 2-phase stator windings.

6. The flywheel battery of claim 5, wherein said power interface electronics further comprises a circuit for providing four regulated and floating 12 vdc outputs, to reliably power upper H-bridge gate drivers, which control the four upper power switching transistors in the two H-bridges.

7. The flywheel battery of claim 1, wherein said power interface electronics further comprises a circuit for providing regulated +12 vdc, −12 vdc, and +5 vdc supplies to the power interface electronics and +5 vdc to Hall-effect sensors that detect rotor angle.

8. The flywheel battery of claim 1, wherein said power interface electronics further comprises circuits to provide accurate absolute value of respective stator winding current, for negative feedback to minor loops that control pulse-width modulation for H-bridge current control, in motor drive and regeneration modes.

9. The flywheel battery of claim 1, wherein said power interface electronics further comprises over-voltage protection by a transient voltage suppressor that clamps the DC power bus voltage and provides a signal that inhibits power regeneration, in concert and redundant with slower DC voltage feedback control.

10. The flywheel battery of claim 1, wherein said power interface electronics further comprises under-voltage lockout, which inhibits drive to power transistors if voltage supplied to signal-processing circuits is below prescribed levels.

11. The flywheel battery of claim 1, wherein said power interface electronics further comprises switch-mode power transistors in H-bridge configuration, which control motor drive current by pulse-width-modulation switching of diagonal transistor pairs in said H-bridge, wherein turn-off of one transistor in each transistor pair is delayed a time approximating the pulse-width-modulation period, to minimize power lost by the electronics and reduce high-frequency pulse amplitudes at the pulse-width-modulation frequency, and wherein turn-on delay at each mode transition is included to prevent shoot-through currents.

12. The flywheel battery of claim 1, wherein said housing and support structure further comprises self-leveling means having a frame which rests on a liner, the frame from its upper structure supporting two gimbals, the first gimbal having a nominally horizontal axis to accommodate rotation by gravitational force on the flywheel assembly center of mass, is attached to the upper structure, and the second having an axis in a horizontal plane 90 degrees from the first, attached to a rigid cylinder affixed to the top of the flywheel assembly vacuum enclosure, to accommodate rotation about the gimbal axis, to maintain a level vertical spin-axis flywheel assembly within a vacuum enclosure which does not rotate parallel to said spin-axis.

13. The flywheel battery of claim 1, wherein said vacuum enclosure further comprises a sealable cylindrical container having a relatively large space inside, and means for purging internal contaminants by maintaining the enclosure and its flywheel assembly contents in vacuum while at elevated temperature, the enclosure and its contents having a center of mass coincident with its geometric center, to facilitate self-leveling.

14. The flywheel battery of claim 1, further comprising fail-safe backup means for said bearing means, including:

a stationary annular axial and radial backup bearing, having a sliding surface beneath the rotor, to restrict downward rotor excursions, which does not normally make contact, and a sliding surface surrounding the rotor near its bottom, to restrict radial excursions, which does not normally make contact; and a stationary annular axial and radial backup bearing, having a sliding surface above the rotor, to restrict upward rotor excursions, which does not normally make contact, and a sliding surface surrounding the rotor near its top, to restrict radial excursions, which does not normally make contact.

15. The flywheel battery of claim 1, wherein said power interface electronics further comprises display means to visually present flywheel rotor speed, DC power bus voltage, external power exchange with the DC power bus, and flywheel system idling power.

16. The flywheel battery of claim 1, wherein said power interface electronics further comprises automatic shut-down means responsive to an accelerometer mounted to the flywheel assembly, to initiate a command to reduce rotor speed level if excess vibration is detected.

17. The flywheel battery of claim 1, wherein said two ball bearings are axially positioned the furthest practical distance from each other, cooperative with a rotor assembly having a maximum practical axial-to-diameter dimension ratio, to minimize radial loads on the ball bearings caused by precession torque on the spinning rotor due to Earth rotation about its axis.

18. A flywheel battery, for storing electric power from a DC power bus as kinetic energy and regenerating electric power with minimal losses, comprising:

motor/generator means in a flywheel assembly, including poly-phase stator windings for conducting poly-phase sinusoidal currents, the windings formed from multi-strand insulated conductors for eddy blocking and bucking, cooperative with a juxtaposed alternated-pole permanent-magnet array affixed to rotor iron for providing radial flux that interacts with said currents, and rotor angle sensors each aligned with a respective stator winding phase, for providing poly-phase feedback signals that vary essentially sinusoidally with rotor angle;

power interface electronics, with H-bridges connected to the DC power bus and to the poly-phase stator windings of the motor/generator, said electronics responsive to the rotor angle sensors and to the DC bus voltage, for controlling by pulse-width-modulation poly-phase current through the stator windings so its resultant magnetic field rotates synchronously with the rotor;

a flywheel rotor having a vertical spin axis, supported by bearing means comprised of repelling annular axial-field magnets centered by two ceramic ball bearings, including axial preload springs that augment the axial support of said axial-field magnets, the rotor including rotary inertia for storing kinetic energy, plus rotor elements of the motor/generator;

a vacuum enclosure, containing mounting therein for the flywheel assembly, and hermetic connections to the power interface electronics outside the enclosure; and a housing and support structure, for the vacuum enclosure and flywheel assembly therein;

wherein said power interface electronics further comprises switch-mode power transistors in H-bridge configuration, which control motor drive current by pulse-width-modulation switching of diagonal transistor pairs in said H-bridge, wherein turn-off of one transistor in each transistor pair is delayed a time approximating the pulsewidth-modulation period, to minimize power lost by the electronics and reduce high-frequency pulse amplitudes at the pulse-width-modulation frequency, and wherein turn-on delay at each mode transition is included to prevent shoot-through currents.

19. A flywheel battery, for storing electric power from a DC power bus as kinetic energy and regenerating electric power with minimal losses, comprising:

motor/generator means in a flywheel assembly, including poly-phase stator windings for conducting poly-phase sinusoidal currents, the windings formed from multi-strand insulated conductors for eddy blocking and bucking, cooperative with a juxtaposed alternated-pole permanent-magnet array affixed to rotor iron for providing radial flux that interacts with said currents, and rotor angle sensors each aligned with a respective stator winding phase, for providing poly-phase feedback signals that vary essentially sinusoidally with rotor angle;

power interface electronics, with H-bridges connected to the DC power bus and to the poly-phase stator windings of the motor/generator, said electronics responsive to the rotor angle sensors and to the DC bus voltage, for controlling by pulse-width-modulation poly-phase current through the stator windings so its resultant magnetic field rotates synchronously with the rotor;

a flywheel rotor having a vertical spin axis, supported by bearing means comprised of repelling annular axial-field magnets centered by two ceramic ball bearings, including axial preload springs that augment the axial support of said axial-field magnets, the rotor including rotary inertia for storing kinetic energy, plus rotor elements of the motor/generator;

a vacuum enclosure, containing mounting therein for the flywheel assembly, and hermetic connections to the power interface electronics outside the enclosure; and a housing and support structure, for the vacuum enclosure and flywheel assembly therein;

wherein said housing and support structure further comprises self-leveling means having a frame which rests on a liner, the frame from its upper structure supporting two gimbals, the first gimbal having a nominally horizontal axis to accommodate rotation by gravitational force on the flywheel assembly center of mass, is attached to the upper structure, and the second having an axis in a horizontal plane 90 degrees from the first, attached to a rigid cylinder affixed to the top of the flywheel assembly vacuum enclosure, to accommodate rotation about the gimbal axis, to maintain a level vertical spin-axis flywheel assembly within a vacuum enclosure which does not rotate parallel to said spin-axis.

* * * * *